(12) United States Patent
Dai et al.

(10) Patent No.: US 7,831,107 B2
(45) Date of Patent: Nov. 9, 2010

(54) IMAGE PROCESSING APPARATUS, IMAGE PROCESSING METHOD, AND PROGRAM

(75) Inventors: Xiaoyan Dai, Yokohama (JP); Hidefumi Osawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1068 days.

(21) Appl. No.: 11/539,428

(22) Filed: Oct. 6, 2006

(65) Prior Publication Data

US 2007/0086667 A1    Apr. 19, 2007

(30) Foreign Application Priority Data

Oct. 17, 2005  (JP) .............................. 2005-302156
Dec. 5, 2005   (JP) .............................. 2005-351309

(51) Int. Cl.
G06K 9/40 (2006.01)
G06K 9/38 (2006.01)
G06K 9/34 (2006.01)
G06K 9/48 (2006.01)
G09G 5/00 (2006.01)

(52) U.S. Cl. .................. 382/266; 382/172; 382/180; 382/199; 345/581

(58) Field of Classification Search ................. 382/173, 382/266

See application file for complete search history.

(56) References Cited

U.S. PATENT DOCUMENTS 5,101,448 A * 3/1992 Kawachiya et al. ......... 382/287
5,680,487 A   10/1997 Markandey ................. 382/291
6,901,171 B1 * 5/2005 Dutta-Choudhury et al. .......................... 382/266
2007/0025617 A1  2/2007 Dai et al. .................... 382/180

FOREIGN PATENT DOCUMENTS

JP    02885999      2/1994
JP    2002-314806  10/2002

* cited by examiner

*Primary Examiner*—Matthew C Bella
*Assistant Examiner*—Jose M Torres
(74) *Attorney, Agent, or Firm*—Fitzpatrick, Cella, Harper & Scinto

(57) ABSTRACT

An image processing apparatus, image processing method, and program which enable generation of vector data capable of replicating a clipart region of a raw image as faithfully as possible are provided. To accomplish this, a raw image is segmented into region images according to attributes. From the segmented region images, a region image having a predetermined attribute is cut out from the raw image. At least one representative color which configures the predetermined region image is decided based on an appearance color of the cut out predetermined region image. A color image having the decided representative color is extracted from the predetermined region image. A contour line of the extracted color image is extracted. An edge image within the predetermined region image is extracted. The extracted contour line is corrected based on the extracted edge image. Using the corrected contour line, vector data of the predetermined region image is generated.

5 Claims, 27 Drawing Sheets

FIG. 8
PREVIOUS BOUNDARY POINT
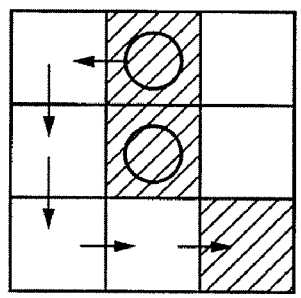
ATTENTION BOUNDARY POINT
NEXT BOUNDARY POINT
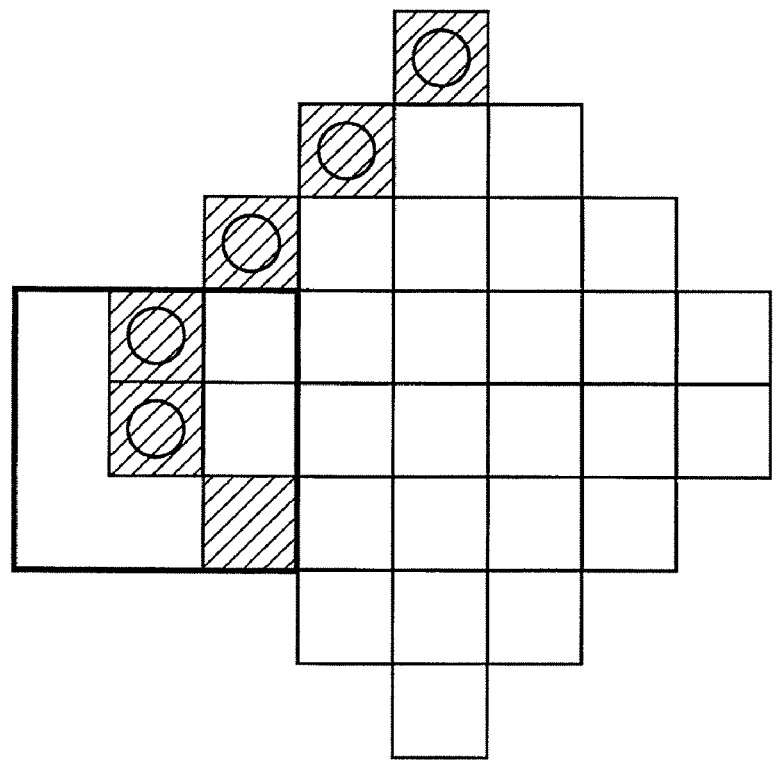

FIG. 11

```
1101 —— <path
1102 ——   fill="color1"                    (COMMENT FILL COLOR)
1103 ——   stroke="color2"                  (COMMENT CONTOUR LINE COLOR)
1104 ——   stroke-width="line-width"        (COMMENT CONTOUR LINE WIDTH)
          d="M264, 614h2 v8h-2Z"
          (COMMENT
          COORDINATE MOVEMENT M(absolute) m(relative)
          HORIZONTAL H(absolute) h(relative)
1105 ——   VERTICAL V(absolute) v(relative)
          CUBIC BEZIER APPROXIMATION C(absolute) c(relative)
          QUADRATIC BEZIER APPROXIMATION Q(absolute) q(relative)
          CLOSEPATH Z or z
        />
```

COMPOSITE PATH

<path d="M86, 80h1128c3, 0 6, 5 6, v180h-1134c-3, 0 -6, -5 -6, -6v-174c0, -3 5, -6 6, -6M82, 264h1136v-182h-1136z"/>

PARTIAL PATH

<path fill="none" stroke="#000000" d="M86, 80h1128c3, 0 6, 5 6, 6v180h-1134c-3, 0 -6, -5 -6, -6v-174c0, -3 5, -6 6, -6z"/>

<path fill="none" stroke="#000000" d="M82, 264h1136v-182h-1136z"/>

FIG. 19
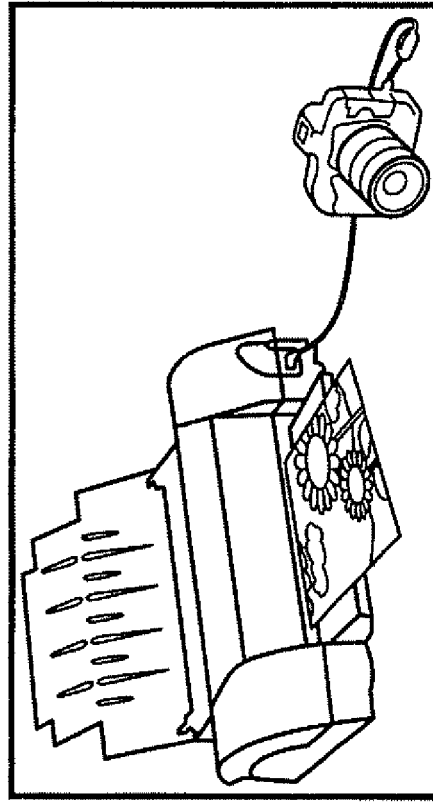
1051
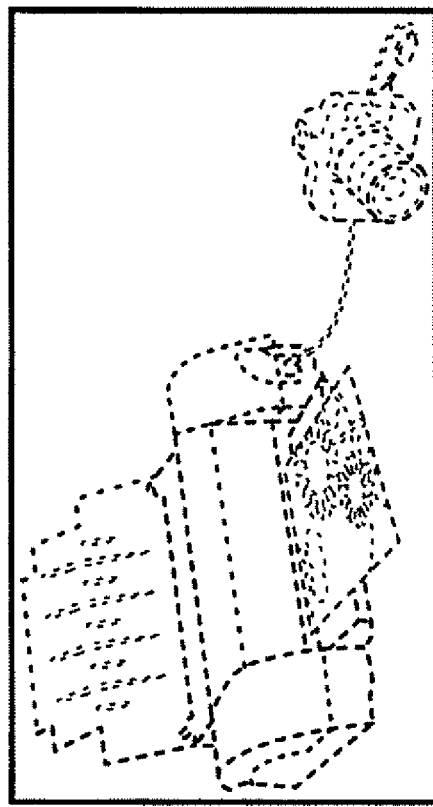
1052

FIG. 25
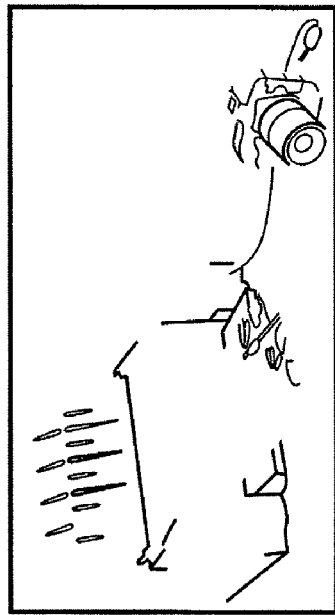
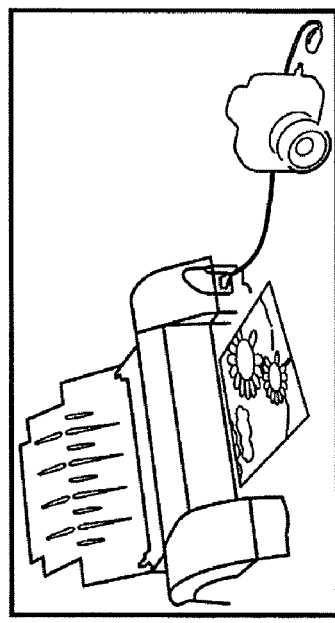
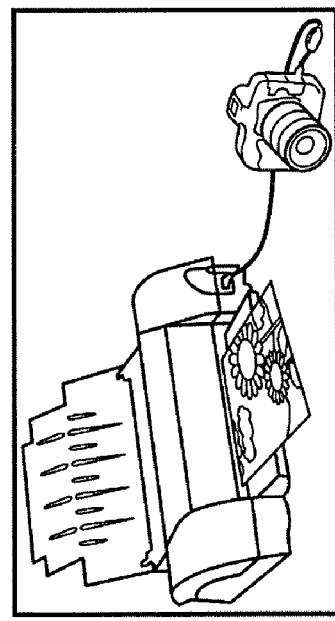

FIG. 26
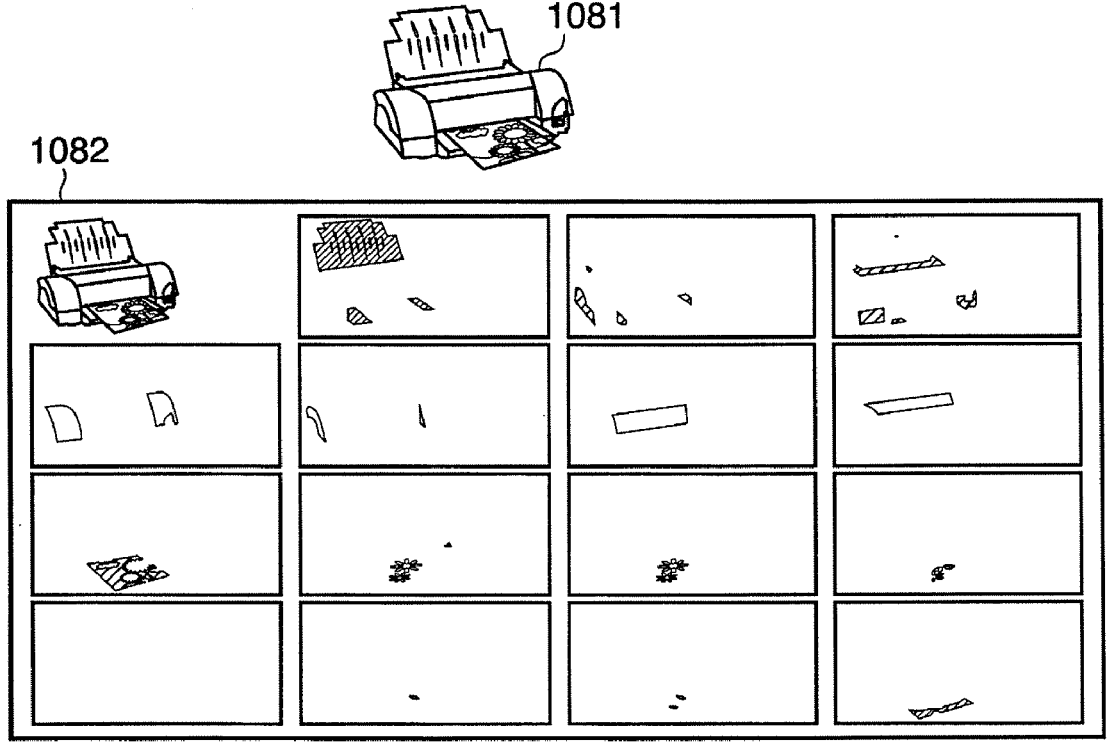
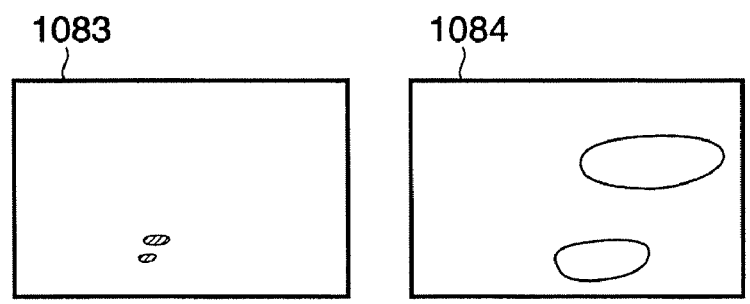
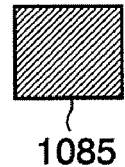
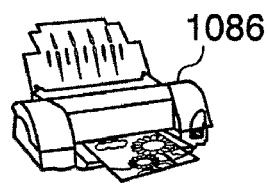

IMAGE PROCESSING APPARATUS, IMAGE PROCESSING METHOD, AND PROGRAM

BACKGROUND OF THE INVENTION

1. Field of the Invention

The present invention relates to a technology of converting raw images to vector data.

2. Description of the Related Art

In recent years, digitization of information has given rise to dissemination of systems which store or transmit electronic documents generated by digitizing paper documents, instead of on paper. Documents subject to such digitization are spreading from black and white binary documents to full color (multivalued) documents.

The term "electronic documents" here not only refers to image digitization of paper-based documents using an image reading apparatus such as a scanner, but also includes image data resulting from region segmentation performed on obtained document images on a per-attribute basis and post-processing performed according to each region. Examples of such post-processing include, for text regions, processing involving character recognition for conversion into character code strings. In addition, examples for line art regions include processing involving conversion into outline vector data.

Conventionally, many attempts have been made to create such electronic documents. A conventional example of region segmentation of document images is described in Japanese Patent Laid-Open No. 2002-314806.

This literature discloses a configuration in which a binarized image of an inputted color image is generated, and the generated binarized image is segmented into regions including, for instance, a text region, a line art region, a photographic region (picture region) and the like. The region segmentation method used therein involves calculating connectedness of a binary image to determine the sizes of clusters of black pixels, and segmenting the binary image into a text region, a line art region, a picture region and the like while collating the characteristics of each region.

In addition, a conventional example of outline vectorization for converting into outline vector data is described in Japanese Patent No. 02885999. In this literature, contour lines are vectorized by performing contour line tracing on a binary image and selecting obtained coordinate vectors. Furthermore, obtained vector data may even be used in a CAD system by substituting the vector data with a graphic instruction for drawing a polygon or the like.

A sample of a document image will now be described using FIG. 13.

This document image is printed on a recording paper by an output apparatus such as a printer. As for characters, large characters, such as a title, or relatively small characters, such as descriptive text, are arranged in the document image. In addition, images are composed of a photographic image and an image (such as an illustration image or the like) which contains a relatively smaller number of output colors as compared to photographic images (natural images). Herein, images with a relatively small number of output colors will be referred to as clipart images.

By reading some printed material on which the document image is printed by an image reading apparatus such as a image scanner, and performing region segmentation processing on the read image, a text region 23, a photographic region 21 and a clipart region 22 are obtained, as shown in the drawing.

In addition, with regard to the clipart region 22, a separate "region segmentation processing" is performed on the image comprising the clipart region 22 to collect same-colored portions and fusing such portions into one region. Next, vectorization processing is performed on the obtained same-colored region. Through this vectorization processing, vectorization of each region obtained by segmenting the clipart region according to color may be conceivably realized by representing each obtained same-color region by its contour line and internal color information.

However, with the above-described region segmentation processing within a clipart region, the following problems occur.

These problems will now be described using FIG. 14.

FIG. 14 is a diagram for explaining an example of region-segmenting a clipart region into same-colored regions.

Reference numeral 30 denotes an example of a processing object raw image. Reference numeral 31 denotes an example of a region image (contour line image) segmented from the read raw image. Reference numeral 32 denotes an example of an edge image obtained by performing edge extraction processing on the read image.

As depicted, contours differ for each image. Such differences in contours may be attributed to misalignments of extracted contours caused by variations in density around the edges which result in thinning of colors, or occurrences of false colors, due to variations in level upon reading (blurring, read resolution and the like) or deterioration in image quality caused by image compression.

In FIG. 14, the shapes of the contour lines of the raw image 30 and the edge image 32 are relatively similar, while the shapes of the contour lines of the region image 31 and the edge image 32 (or the raw image 30) are considerably different. Therefore, vectorization processing performed on a clipart region obtained in this manner will not generate vector data capable of faithfully representing the configuration of the raw image.

Additionally, for instance, when performing vectorization processing based on the above-described contour extraction on a clipart image in which the color green was clear to begin with, the green may disappear during binarization due to noise. Furthermore, even with vectorization processing based on the above-described region segmentation, there is a problem in which the green portion is segmented into a large number of clusters, or a problem in which non-green portions and green portions are erroneously placed in the same cluster. Such problems may result in an increase in vector data volume, or segmentation in inefficient forms upon componentization.

SUMMARY OF THE INVENTION

The present invention has been made in order to solve the above problems, and an object thereof is to generate vector data capable of replicating the clipart region of the raw image as faithfully as possible.

According to the first aspect of the present invention, the foregoing object is attained by providing an image processing apparatus adapted to execute image processing which converts a raw image into vector data, the image processing apparatus comprising:

a segmentation unit adapted to segment the raw image into region images for each attribute;

a cutout unit adapted to cut out region images segmented by the segmentation unit according to attribute from the raw image;

a determination unit adapted to determine at least one representative color configuring the region image cut out by the cutout unit, based on an appearance color of the region image;

an image extraction unit adapted to extract a color image having the representative color determined by the determination unit from the region image;

a contour line extraction unit adapted to extract a contour line of a color image extracted by the image extraction unit;

an edge image extraction unit adapted to extract an edge image within the region image;

a correction unit adapted to correct a contour line extracted by the contour line extraction unit based on an edge image extracted by the edge image extraction unit; and a generation unit adapted to generate vector data of the region image using contour lines corrected by the correction unit.

According to the second aspect of the present invention, the foregoing object is attained by providing an image processing method for converting a raw image into vector data, the image processing method comprising the steps of:

segmenting the raw image into region images for each attribute;

cutting out region images segmented in the segmentation step according to attribute from the raw image;

determining at least one representative color configuring the region image cut out in the cutout step, based on an appearance color of the cut-out region image;

extracting a color image having the representative color determined in the determination step from the region image;

extracting a contour line of a color image extracted in the image extraction step;

extracting an edge image within the region image;

correcting a contour line extracted in the contour line extraction step based on an edge image extracted in the edge image extraction step; and generating vector data of the region image using contour lines corrected in the correction step.

According to the third aspect of the present invention, the foregoing object is attained by providing a computer-readable storage medium storing a computer program for controlling an image processing apparatus executing image processing for converting a raw image into vector data, the program causing a computer to execute the steps of:

segmenting the raw image into region images for each attribute;

cutting out region images segmented in the segmentation step according to attribute from the raw image;

determining at least one representative color configuring the region image cut out in the cutout step, based on an appearance color of the cut-out region image;

extracting a color image having the representative color determined in the determination step from the region image;

extracting a contour line of a color image extracted in the image extraction step;

extracting an edge image within the region image;

correcting a contour line extracted in the contour line extraction step based on an edge image extracted in the edge image extraction step; and generating vector data of the region image using contour lines corrected in the correction step.

According to the fourth aspect of the present invention, the foregoing object is attained by providing an image processing method for inputting a document image including a clipart image to an image processing apparatus to perform vectorization, the image processing method comprising the steps of:

region-segmenting the document image and selected the clipart image;

extracting edge information from the clipart image;

forming an edge cluster based on the edge information;

segmenting a pixel portion of the clipart image other than the edge cluster into a plurality of clusters based on color characteristics;

fusing two ore more clusters other than the edge cluster which are similar to each other; and converting each cluster after cluster fusion to vector data based on a contour line and an internal color of each cluster.

According to the fifth aspect of the present invention, the foregoing object is attained by providing an image processing apparatus adapted to vectorize a document image including a clipart image, the image processing apparatus comprising:

an input unit adapted to input the document image;

a selection unit adapted to region-segment the document image and select the clipart image;

an extraction unit adapted to extract edge information from the clipart image;

an edge cluster formation unit adapted to form an edge cluster based on the edge information;

a segmentation unit adapted to segment a pixel portion of the clipart image other than the edge cluster into a plurality of clusters based on color characteristics;

a cluster fusion unit adapted to fuse two or more clusters other than the edge cluster, which are similar to each other; and a conversion unit adapted to convert each cluster after cluster fusion to vector data based on a contour line and an internal color of each cluster.

According to the sixth aspect of the present invention, the foregoing object is attained by providing an image processing apparatus adapted to vectorize a document image including a clipart image, the image processing apparatus comprising:

an input unit adapted to input the document image;

a selection unit adapted to region-segment the document image and select the clipart image;

an extraction unit adapted to extract edge information from the clipart image;

an edge cluster formation unit adapted to form an edge cluster based on the edge information;

a segmentation unit adapted to segment a pixel portion of the clipart image other than the edge cluster into a plurality of clusters based on color characteristics;

a cluster fusion unit adapted to fuse two or more clusters other than the edge cluster which are similar to each other; and a conversion unit adapted to convert each cluster after cluster fusion to vector data based on a contour line and an internal color of each cluster.

According to the seventh aspect of the present invention, the foregoing object is attained by providing a computer-readable storage medium storing a computer program for causing a computer, which inputs a document image including a clipart image to perform vectorization, to execute the procedures of:

region-segmenting the document image and selecting the clipart image;

extracting edge information from the clipart image;

forming an edge cluster based on the edge information;

supplementing a pixel portion of the clipart image other than the edge cluster into a plurality of clusters based on color characteristics;

fusing two or more clusters other than the edge cluster which are similar to each other; and converting each cluster after cluster fusion to vector data based on a contour line and an internal color of each cluster.

Further features of the present invention will be apparent from the following description of exemplary embodiments with reference to the attached drawings.

BRIEF DESCRIPTION OF THE DRAWINGS

FIG. 8 is a diagram for explaining a specific example of a contour line extraction unit according to the first embodiment of the present invention;

FIG. 11 is a diagram showing an example of contour line information according to the first embodiment of the present invention;

FIG. 12 is a diagram showing an example of contour line information according to the first embodiment of the present invention;

FIG. 19 is a diagram showing an edge cluster formed from a clipart image by the image processing according to the second embodiment of the present invention;

FIG. 25 is a diagram showing an example of fusion of a segmented cluster with a cluster which has been determined to be an edge cluster according to the second embodiment of the present invention;

FIG. 26 is a diagram showing an example of vectorization based on region segmentation of a clipart image according to the second embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
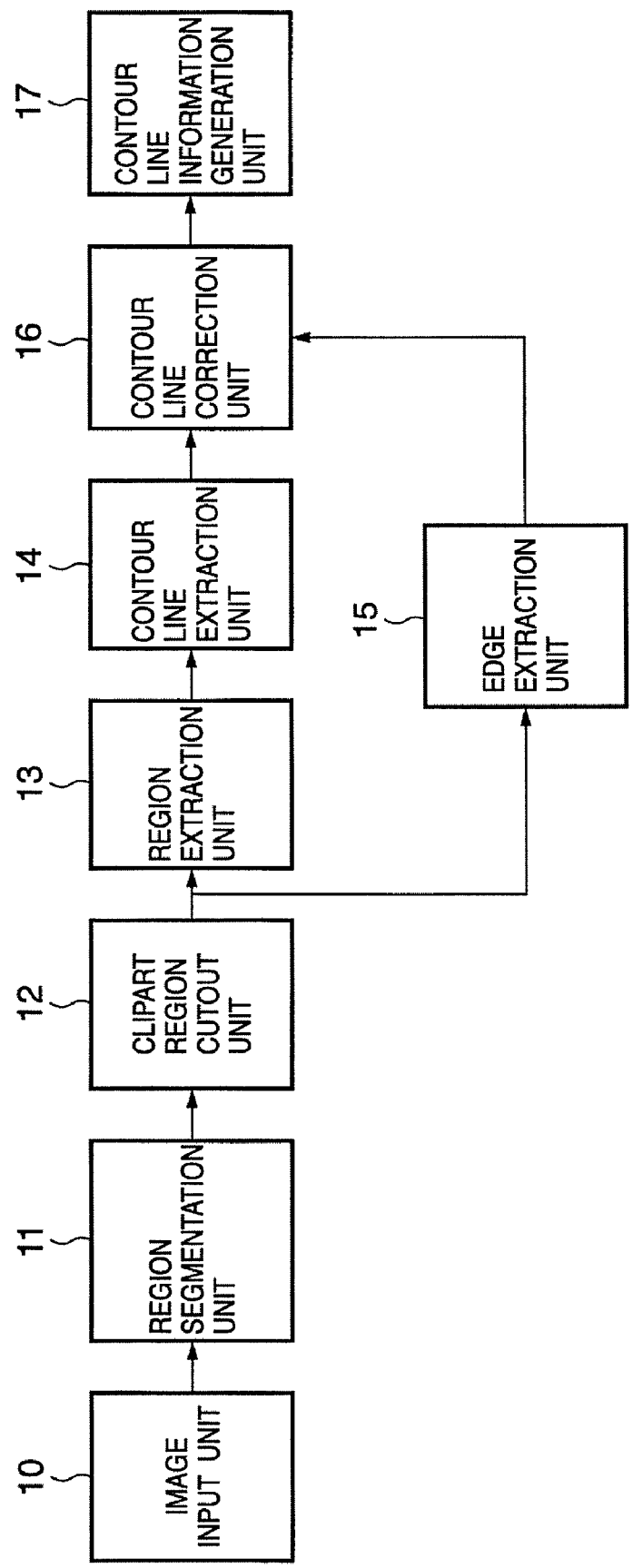
FIG. 1 is a block diagram showing a configuration of an image processing apparatus according to a first embodiment of the present invention.

FIG. 1 is a block diagram showing a configuration of an image processing apparatus according to a first embodiment of the present invention. Reference numeral 10 denotes an image input unit, which is, for example, an image reading apparatus such as a scanner. A processing object original image is inputted through this unit. Reference numeral 11 denotes a region segmentation unit which segments the inputted original image according to attributes into regions (for instance, rectangular regions) such as a text region, a line drawing region, a tabular region and a photographic region. Images other than the segmented regions are deemed a background region.

Reference numeral 12 denotes a clipart region cutout unit which further cuts out a clipart region (image) from an obtained photographic region. The term "cut out" here may either mean cutting out an arbitrary region from the photographic region, or cutting out the entire photographic region.

In the present invention, a clipart region will be defined as an image region within a photographic region, in which the number of appearance colors is below or equal to a predetermined number of colors (for instance, 256 tones). An example of such a clipart image is a computer graphic image (an image other than natural images such as photographs) artificially created on an image processing software by the user. In other words, an image in which same-colored pixels configuring the image are relatively nondiscrete, similar to a natural image, corresponds to a clipart image.

Reference numeral 13 denotes a region extraction unit which extracts a color region (color image) for each appearance color of an image configuring the clipart region. Reference numeral 14 denotes a contour line extraction unit which extracts a contour line for each extracted color region.

Reference numeral 15 denotes an edge extraction unit which extracts an edge of a clipart region.

Reference numeral 16 denotes a contour line correction unit which corrects contour lines of color regions of respective appearance colors of the image configuring the clipart region, based on the extraction results by the edge extraction unit 15 and the contour line extraction results by the contour line extraction unit 14.

Reference numeral 17 denotes a contour line information generation unit. Particularly in this embodiment, in the event that a contour line is to be represented by vector data (image description language), the contour line information generation unit 17 generates, as contour line information, description of a drawing command (for instance, an SVG path command) which defines that contour line.

The image processing apparatus may be realized by, for instance, an information processing apparatus such as a personal computer. An information processing apparatus comprises standard components (such as a CPU, a RAM, a ROM, a hard disk, an external storage device, a network interface, a display, a keyboard, a mouse and the like) mounted on a general-purpose computer.

Vectorization processing of a clipart region will now be described with reference to FIG. 2.

Figure 2:
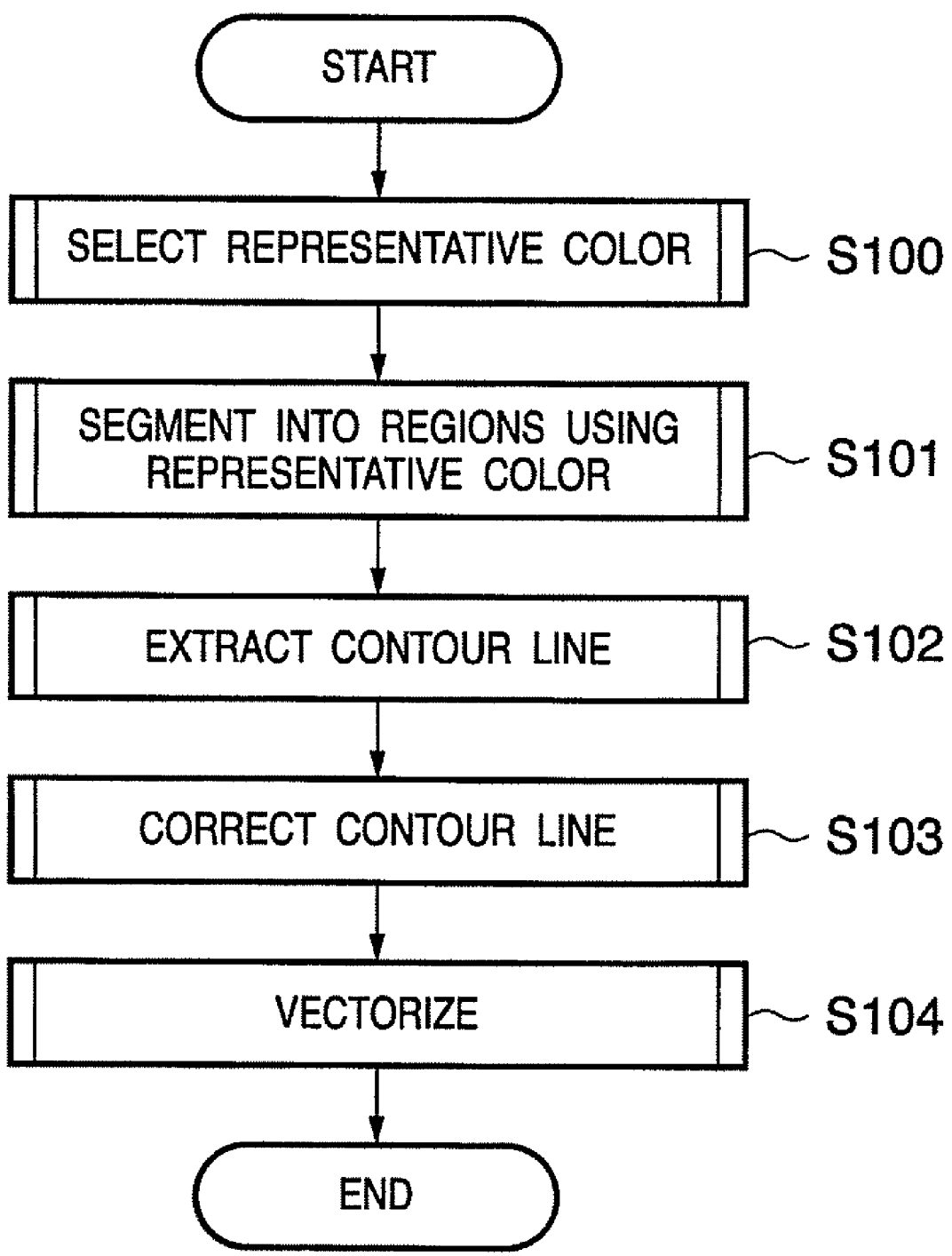
FIG. 2 is a flowchart showing vectorization processing of a clipart region according to the first embodiment of the present invention.

FIG. 2 is a flowchart showing vectorization processing of a clipart region according to the present embodiment of the present invention.

In step S100, the region extraction unit 13 selects a representative color within the clipart region. In step S101, the region extraction unit 13 executes region segmentation using the selected representative color. In step S102, the contour line extraction unit 14 executes contour line extraction on an obtained region.

In step S103, the contour line correction unit 16 executes contour line correction of the extracted contour line. After executing the contour line correction processing, in step S104, the contour line information generation unit 17 uses the selected representative color and the extracted contour line to vectorize the obtained region. This vectorization is realized by, for instance, using SVC (Scalable Vector Graphics) description to generate contour line information in which the contour line is described by a path command and the internal color is described by a fill command.

The contour line correction unit 16 may generate a contour line faithful to the contour line of the clipart region configuring the input image by correcting the contour line extracted by the contour line extraction unit 14 based on extraction results by the edge extraction unit 15. By generating contour line information and performing vectorization on the corrected contour line, it is possible to generate a reproduced image that is more faithful to the input image, which is the original image, when image-developing the obtained vector data.

Details of the processing in step S100 of FIG. 2 will now be described with reference to FIG. 3.

Figure 3:
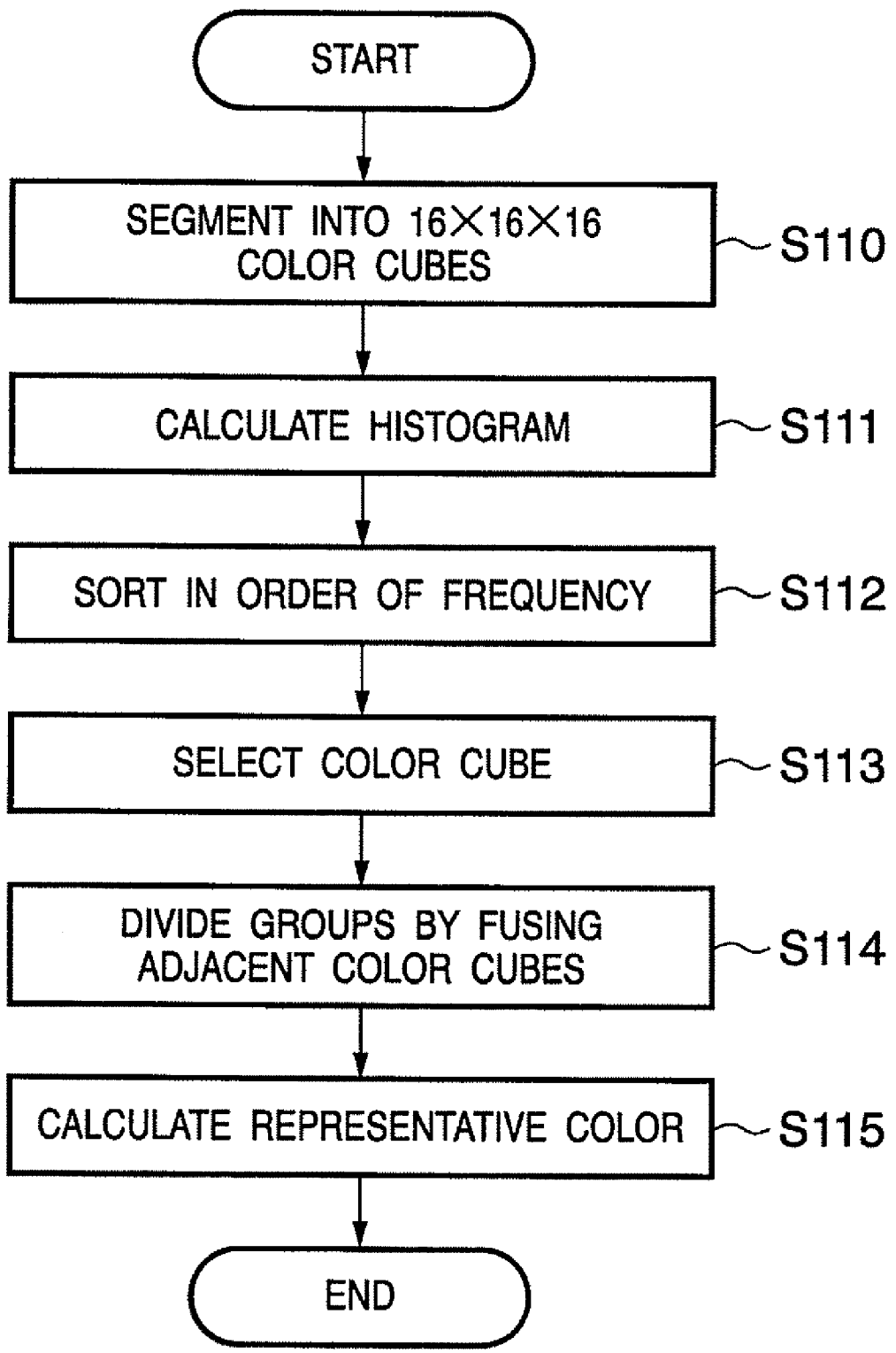
FIG. 3 is a flowchart showing details of processing of step S100 according to the first embodiment of the present invention.

FIG. 3 is a flowchart showing details of processing of step S100 according to the present embodiment of the present invention.

In step S110, if the processing object image configuring the clipart image is assumed to be, for instance, an RGB image with 8 bits for each color, the high 4 bits of each 8-bit color are taken and classified into any of cubes with 16×16×16 color. Each cube will be referred to herein as a color cube.

In step S111, appearance frequencies (histogram) of pixels belonging to a processing object color cube are calculated for each classified color cube.

In step S112, the color cubes are sorted in order of appearance frequencies of pixel values belonging to the color cubes.

In step S113, color cubes up to the Nth (for instance, hundredth) color cube from the color cube with the highest pixel appearance frequency, or color cubes with appearance frequencies which exceed or equal a predetermined value are selected. In other words, color cubes with low pixel appearance frequencies are ignored to execute processing for limiting the colors configuring the processing object image to N number of representative colors or less.

In step S114, when a color in the vicinity of a boundary of a color cube appears most frequently, since the same-color region is counted as frequencies across a plurality of color cubes due to error, determination of same/different color is performed to fuse frequencies of adjacent color cubes to the color cube with the highest appearance frequency.

In step S115, representative colors for each color cube ultimately obtained are calculated. An average color of each color value of appearance pixels on the color cube may be calculated as the representative color, or the most frequently appearance color in the color cube may be calculated as a representative color.

Details of the processing in step S101 of FIG. 2 will now be described with reference to FIG. 4.

Figure 4:
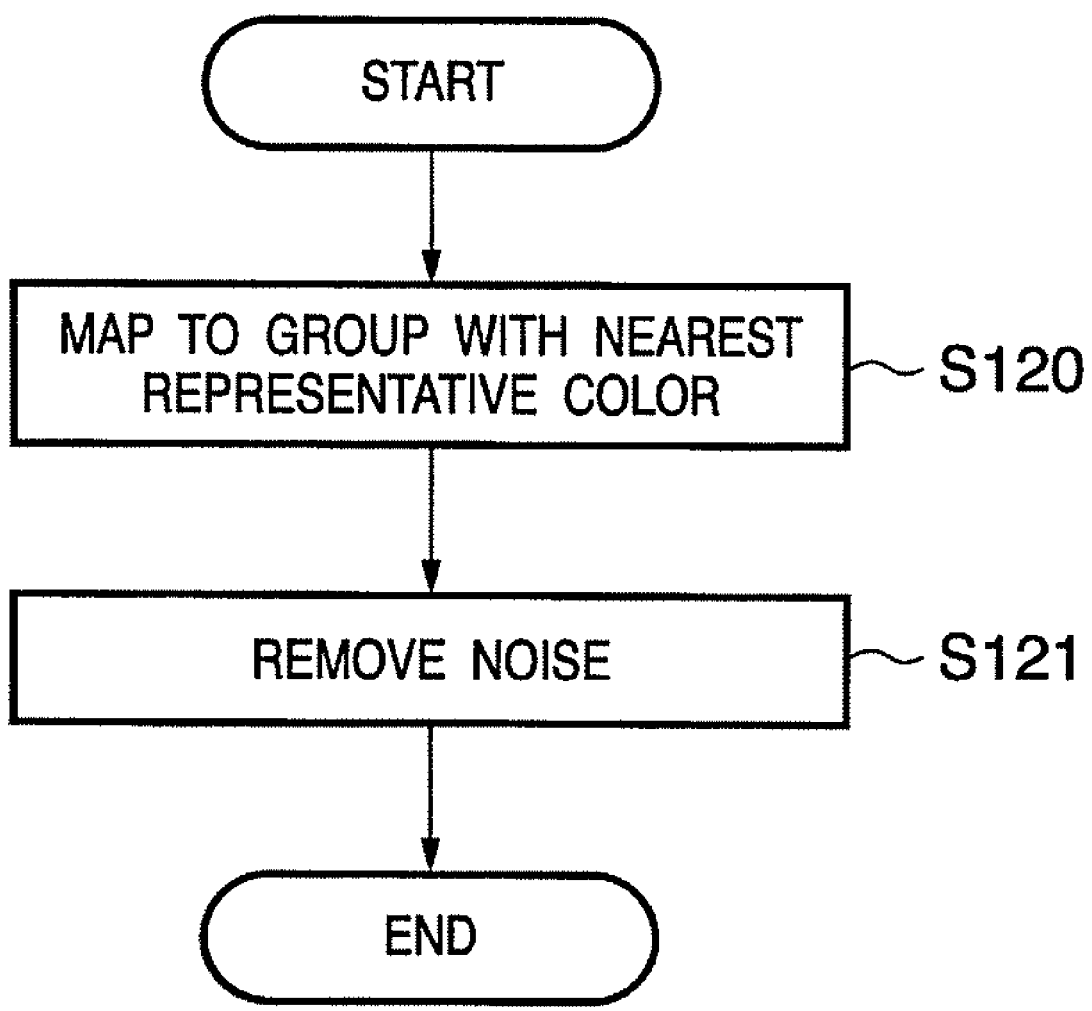
FIG. 4 is a flowchart showing details of processing of step S101 according to the first embodiment of the present invention.

FIG. 4 is a flowchart showing details of processing of step S101 according to the present embodiment of the present invention.

In step S120, each pixel of the processing object image is mapped to a nearest representative color group. An index image will be generated by representing each group by an index value.

In step S121, noise reduction processing of image data is executed. Processing such as reduction of isolated point pixels, reduction of projections in the edge portions, padding and the like may be used for noise reduction processing. The noise reduction processing achieves shaping of the contour line of the processing object image.

Details of the processing in step S102 of FIG. 2 will now be described with reference to FIG. 5.

Figure 5:
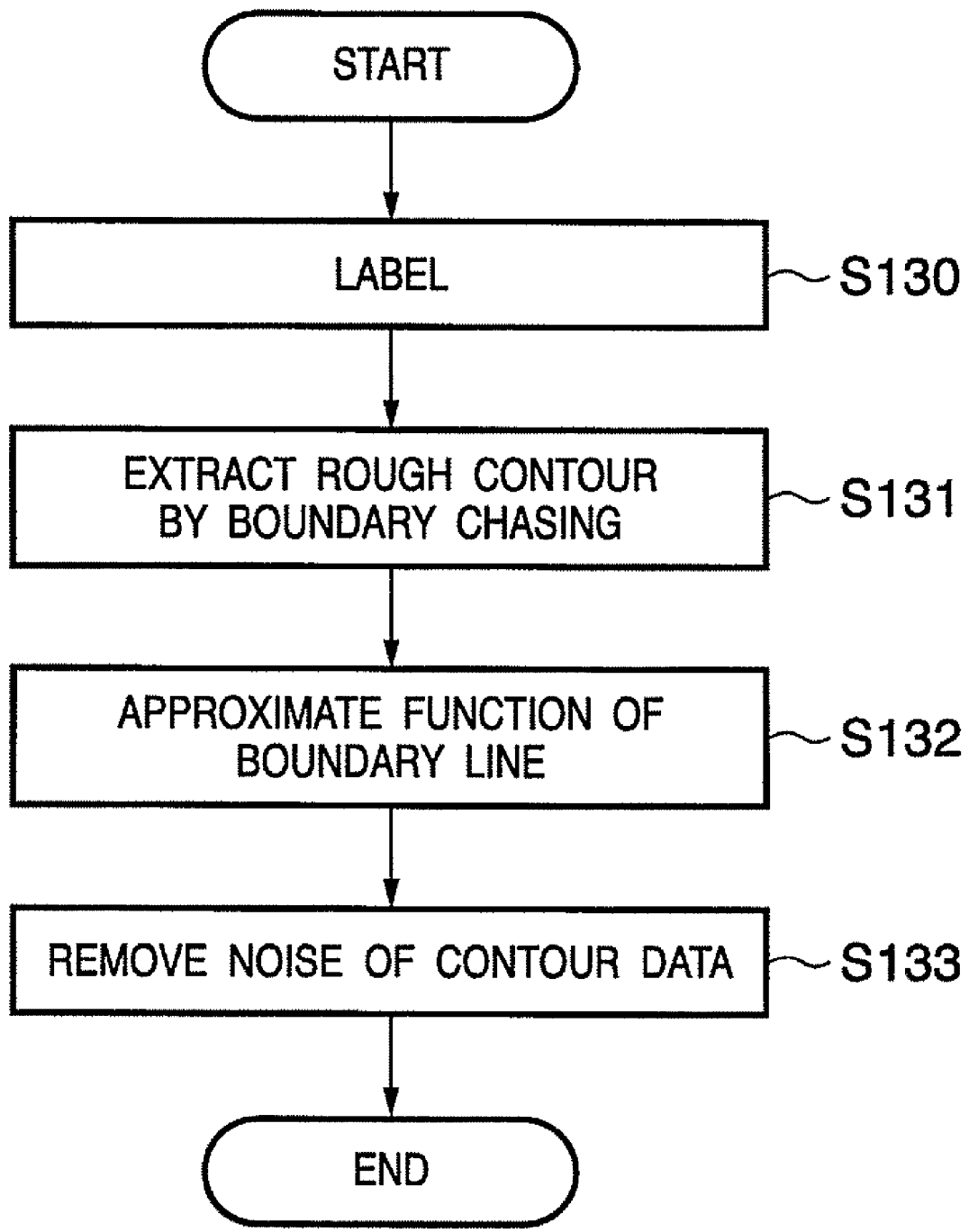
FIG. 5 is a flowchart showing details of processing of step S102 according to the first embodiment of the present invention.

FIG. 5 is a flowchart showing details of processing of step S102 according to the present embodiment of the present invention.

In step S130, an image having the same index value as the index image is generated. Using the generated image as a binary image, labeling processing of the obtained binary image is executed.

In step S131, contour tracing is executed on images of each independent label obtained through labeling processing. In particular, at this point, extraction of (X,Y) coordinate values (rough contour vector) which defines the boundary lines of the images is executed.

In step S132, function approximation of a Bezier function or the like is executed using the extracted rough contour vector data as a reference.

In step S133, noise data is removed from the contour line data obtained by function approximation. The noise data includes those which create small loops.

Details of the processing in step S104 will now be described with reference to FIG. 6.

Figure 6:
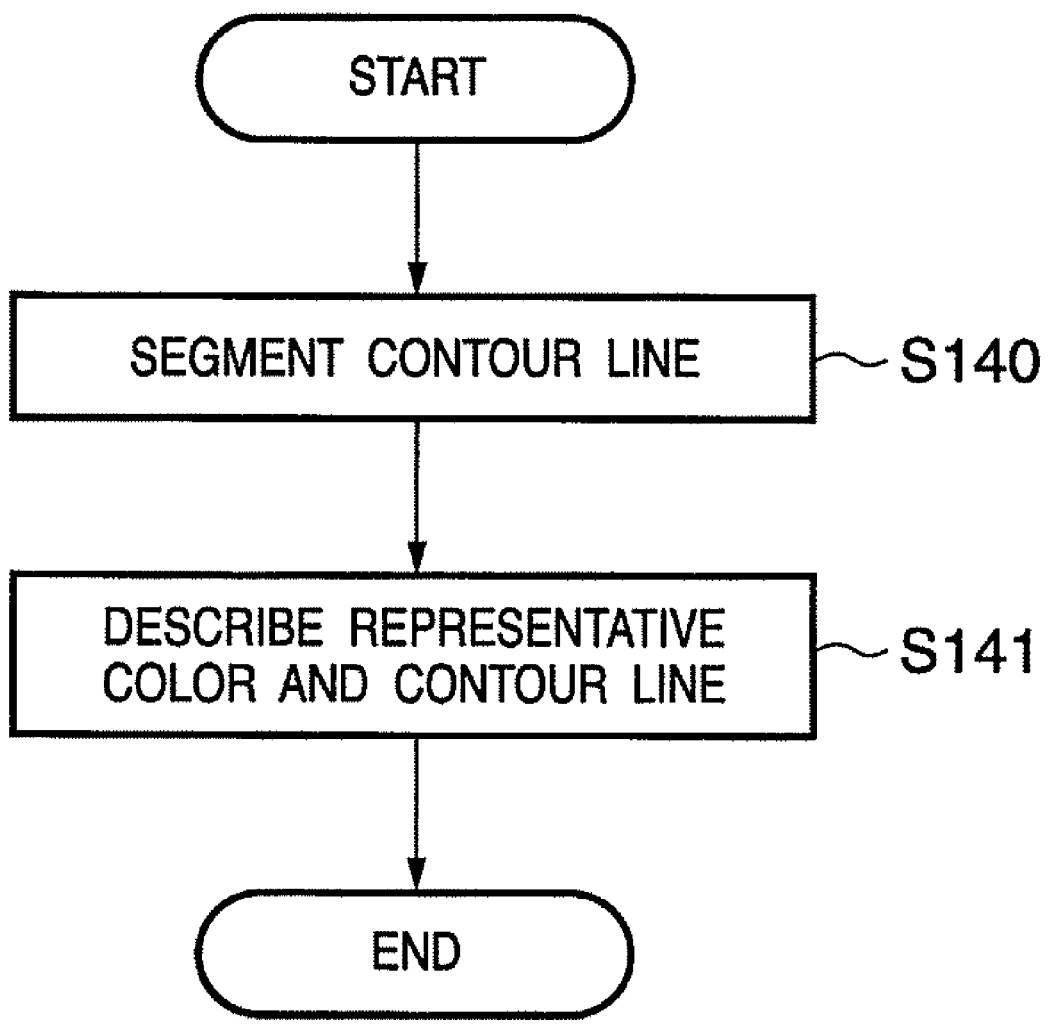
FIG. 6 is a flowchart showing details of processing of step S104 according to the first embodiment of the present invention.

FIG. 6 is a flowchart showing details of processing of step S104 according to the present embodiment of the present invention.

In step S140, SVG path instructions which define the contour line are replaced by independent path instructions for each closed path.

In step S141, contour line information consisting of descriptions indicating an attribute for specifying a color (representative color) within the region and attributes of a thickness or a color of the boundary line is generated for path instructions.

A specific example of vectorization processing of a clipart region will now be described with reference to FIG. 7.

Figure 7:
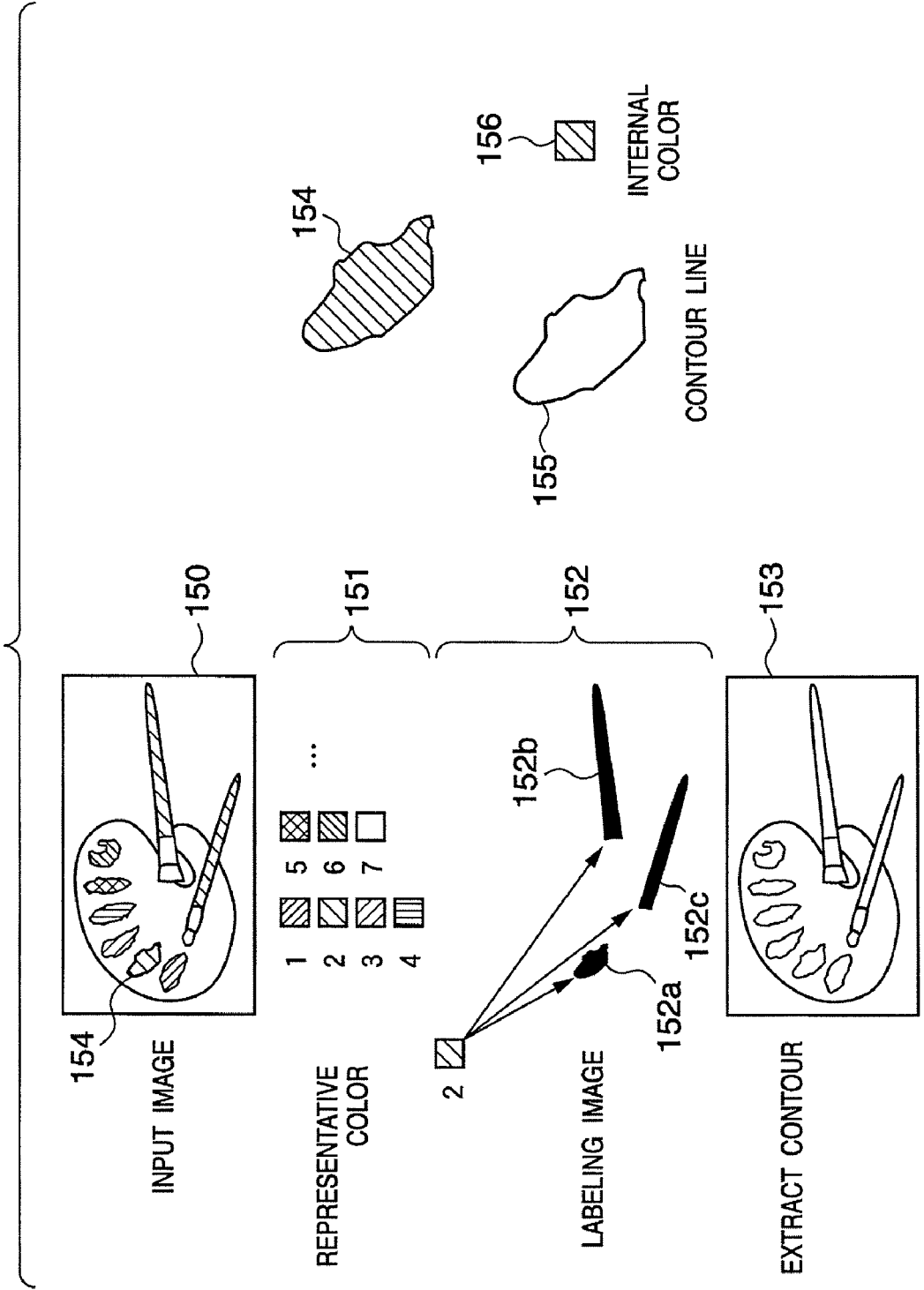
FIG. 7 is a diagram for explaining a specific example of vectorization processing of a clipart region according to the first embodiment of the present invention.

FIG. 7 is a diagram for explaining a specific example of vectorization processing of a clipart region according to the present embodiment of the present invention.

Reference numeral 150 denotes an example of an input image such as, for instance, a bitmap image.

When the processing of step S100 of FIG. 2 is executed on the input image 150, for instance, seven representative colors (color 1 to color 7) are selected as the representative colors 151.

The processing of step S101 is executed to segment the input image 150 into region images of the respective representative colors which configure the input image 150. Image 152 is, for instance, a region image segmented from a color 2 input image 150. In particular, the image 152 is a binary image indicating a same-colored region (color 2) extracted from within the input image 150.

By executing the processing of step S104 on the binary image, or in other words, by executing labeling processing while using each black pixel cluster of the image 152 as a partial region, a labeling image consisting of three partial regions 152a to 152c is obtained from the image 152, as shown in the drawing.

Contour line extraction is respectively executed on the three partial regions 152a to 152c. After executing similar processing on all region images of the respective representative colors, a contour line image 153 is obtained for the input image 150.

As a result, a partial region in the input image 150, for instance the partial region 154 (corresponding to partial region 152a) may be represented by a contour line 155 and its internal color 156. As seen, it is now possible to represent each of a plurality of partial regions which compose the input image by contour line information which indicates a corresponding contour line and internal color. In other words, the input image may now be represented by contour line information of partial regions composing the input image.

A specific example of the contour line extraction unit 14 will now be described with reference to FIG. 8.

FIG. 8 is a diagram for explaining a specific example of a contour line extraction unit according to the present embodiment of the present invention.

Starting from a previous boundary point and proceeding in a counter-clockwise direction around an attention boundary point, the contour line extraction unit 14 searches for a next boundary point. In other words, an operation is executed for searching a pixel which changes from a 0 pixel to a 1 pixel among eight pixels adjacent to the attention pixel. The processing is continued until the process returns to the starting point.

This processing allows contour lines configured as closed loops (closed curves) to be extracted. End points of a contour are used to approximate contour lines using straight lines and curves. This enables contour lines consisting of smoother line segments to be extracted. Vectorization processing will be executed on such contour lines.

A detailed configuration example of the edge extraction unit 15 will now be described with reference to FIG. 9.

Figure 9:
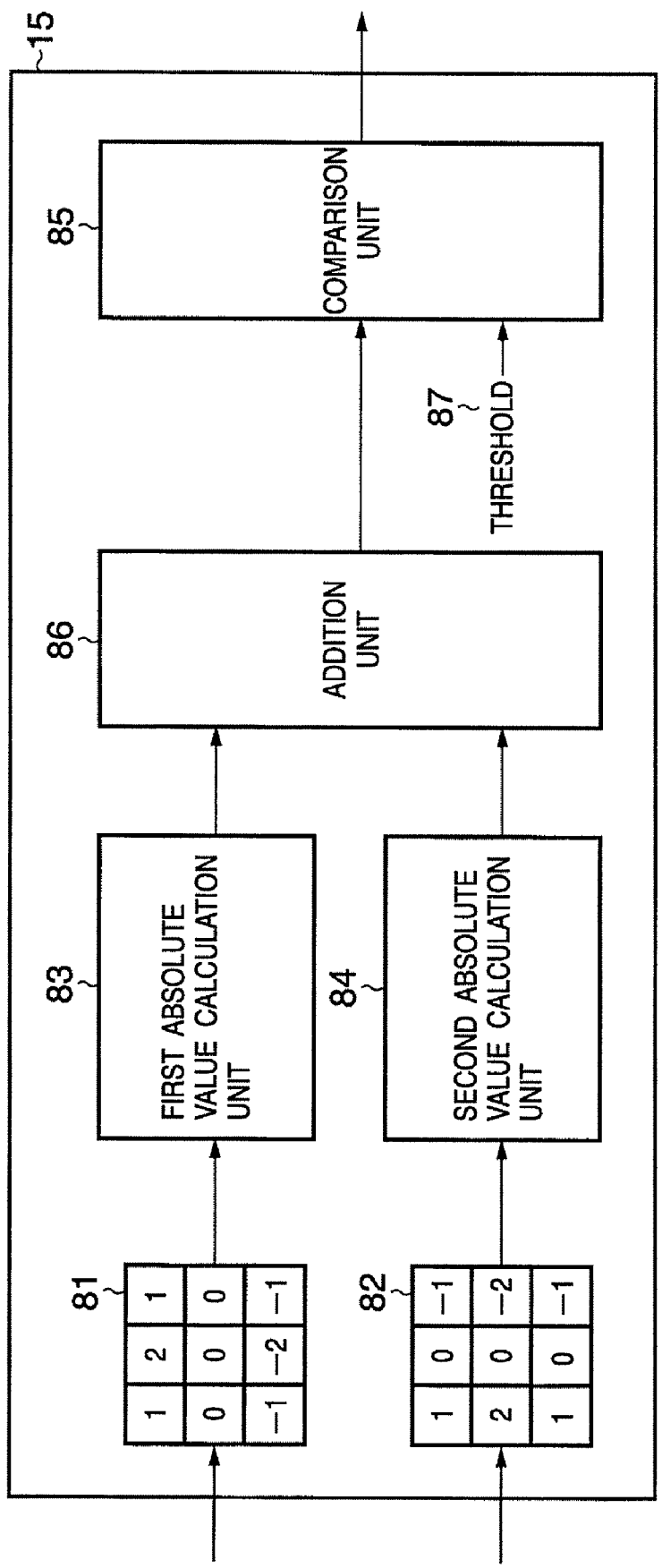
FIG. 9 is a block diagram showing a detailed configuration example of an edge extraction unit according to the first embodiment of the present invention.

FIG. 9 is a diagram showing a detailed configuration example of an edge extraction unit according to the present embodiment of the present invention.

Data is input to the edge extraction unit 15 on a per-pixel basis of the processing object image.

Reference numeral 81 denotes a one-dimensional filter for detecting lateral edges. A first absolute value calculation unit 83 calculates an absolute value for filtering results obtained from the one-dimensional filter 81.

Reference numeral 82 denotes a one-dimensional filter for detecting vertical edges. A second absolute value calculation unit 84 calculates an absolute value for filtering results obtained from the one-dimensional filter 82.

Absolute values obtained from the first absolute value calculation unit 83 and the second absolute value calculation unit 84 are added at an addition unit 86. An addition result obtained from the addition unit 86 is compared with a threshold 87 at a comparison unit 85.

A comparison result from the comparison unit 85 becomes an edge strength of an attention pixel. A group of attention pixels having this edge strength may be aggregated to obtain a contour line of an edge image of a processing target image.

When the edge strength is high, a contour line consisting of closed loops (closed curves) is generated. However, when the edge strength is low, a contour line consisting of closed loops (closed curves) becomes less likely to be generated. Therefore, the edge extraction unit 15 executes binarization so that edge strengths may be more easily enhanced at the comparison unit 85.

A specific example of the contour line correction unit 16 will now be described with reference to FIG. 10.

Figure 10:
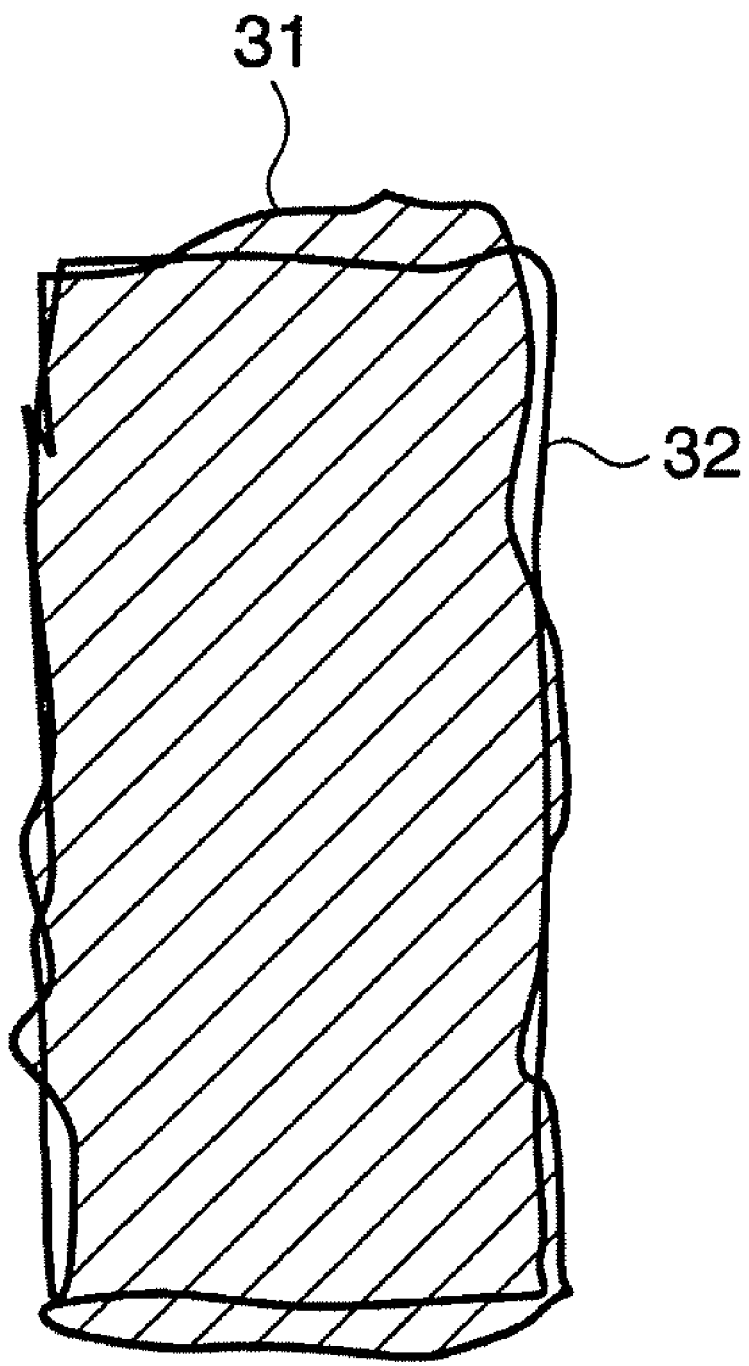
FIG. 10 is a diagram for explaining a specific example of a contour line correction unit according to the first embodiment of the present invention.
Figure 13:
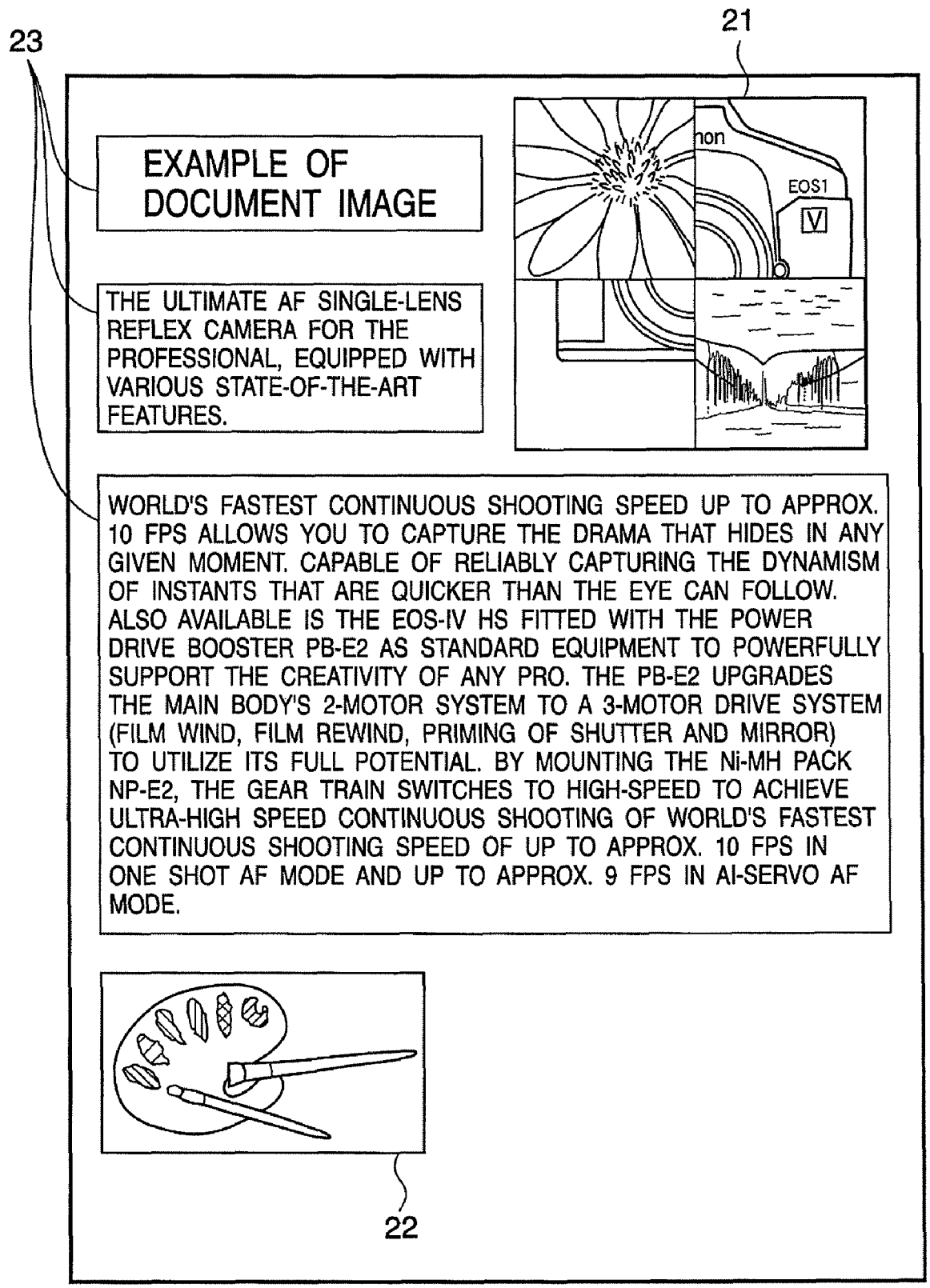
FIG. 13 is a diagram showing a sample of an original image.

FIG. 10 is a diagram for explaining a specific example of a contour line correction unit according to the present embodiment of the present invention.

Figure 14:
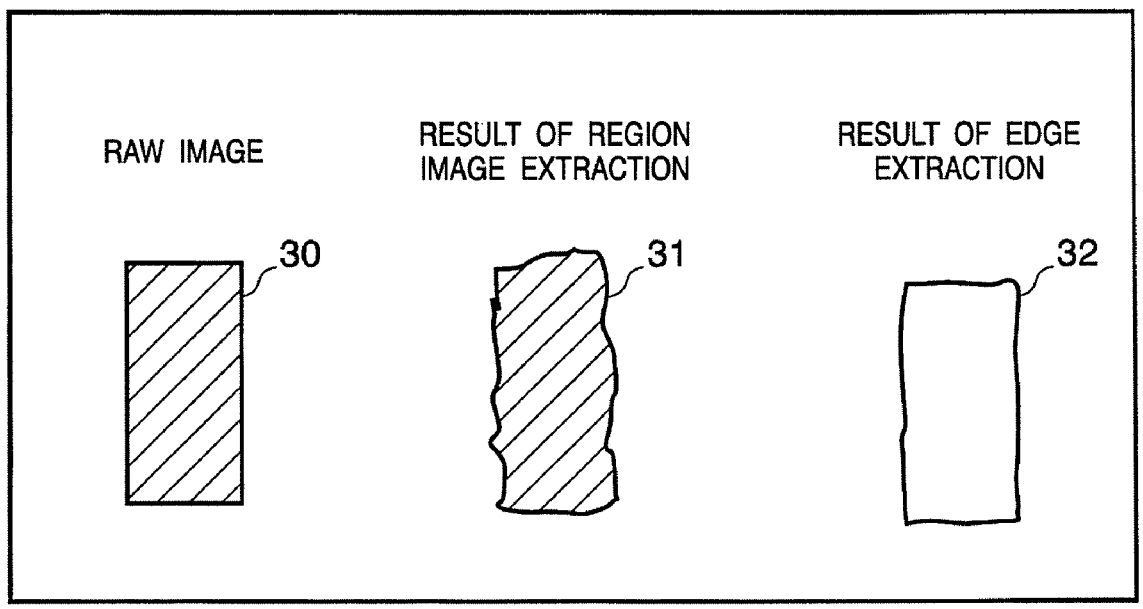
FIG. 14 is a diagram showing an example of region segmentation of a clipart region.

For instance, as shown in FIG. 14, the processing by the contour line extraction unit 14 and the edge extraction unit 15 on the raw image 30 will result in a region image (contour line image) 31 and an edge image 32.

With these images, while the contour line of the edge image 32 exists in the vicinity of the contour line of the raw image 30 as described above, it is likely that the color in the vicinity of the contour line differs from the color of the raw image 30. On the other hand, while the contour of the region image (contour line image) 31 is identical or similar to the color of the raw image, it is likely that the contour has lost its original shape.

In consideration of the above, the contour line correction unit 16 generates a composite image in which the edge image 32 is superimposed on the region image (contour line image) 31. The composite image is processed so that a region surrounded by the contour line of the region image 31 and the contour line of the edge image 32, in which the two images do not overlap each other, is drawn (corrected) by the color of the region image 31, while the contour line of the composite image is corrected to the contour line of the edge image 32.

This allows generation of region images which are as faithful as possible to the contour line of the raw image and which consist of appropriate color components.

An example of contour line information generated by the contour line information generation unit 17 will now be described with reference to FIG. 11.

FIG. 11 is a diagram showing an example of contour line information according to the present embodiment of the present invention.

A clipart image may be represented by contour lines and internal colors of partial regions which configure the image, as described above. As contour line information which indicates such contour lines and internal colors, for instance, SVG (Scalable Vector Graphics) may be used to represent contour lines and internal color.

In FIG. 11, a description 1100 bracketed by < >denotes a common cluster. The description 1100 indicates a description example (path description) of an SVG path command (path instruction).

Description 1101 is a description (fill command (fill instruction)) for specifying an internal color of a region surrounded by contour lines. Description 1102 is a description (stroke command (stroke instruction)) for specifying a color of the contour line. Description 1103 is a description (stroke command (stroke instruction)) for specifying a width of the contour line.

Description 1104 is a description for specifying a drawing position (coordinate value) of the contour line. Particularly, in the description 1104, M is a description indicating an element of relative movement, while h, v respectively indicate instructions for movement of horizontal and vertical relative coordinates, c, q respectively indicate instructions for cubic and quadratic Bezier curves, and z indicates a closepath instruction.

Description 1105 is a comment portion of the description 1104.

When representing a clipart region in an input image with contour line information such as shown in FIG. 11, it is possible to configure the contour line information as shown in FIG. 12. In particular, FIG. 12 shows contour line information consisting of a composite path and a partial path.

Here, a partial path is a single closed curve (contour line loop) represented by a single path description.

In addition, a composite path is a plurality of closed curves (contour line loops) represented by a single path description. By using a composite path to describe an outer contour line and an inner contour line while changing the direction of rotation of the contour line coordinates, the area between the contour lines may be filled with a specified color.

According to the present embodiment as described above, clipart regions during reading of an image are segmented into partial regions for respective same colors, and each segmented partial region is represented by contour lines (closed curves) and colors thereof. When generating vector data of clipart regions, this makes it possible to generate vector data from contour line information (contour line and internal color) of partial regions comprising the clipart region.

When generating contour line information, an edge image is extracted separately for a clipart region. The contour lines of each same-color partial region segmented from the clipart region are corrected based on the edge image.

This edge image is extracted in a shape that is comparatively similar to the contour line of the read image, which is the raw image. Therefore, correcting the contour lines of each same-color partial region segmented from the clipart region using this edge image means that contour line information that is more faithful to the contour line of the image configuring the raw image may be generated.

As seen, the present embodiment may generate vector data of a clipart region capable of more faithfully reproducing the configuration of the raw image.

Second Embodiment

Figure 15:
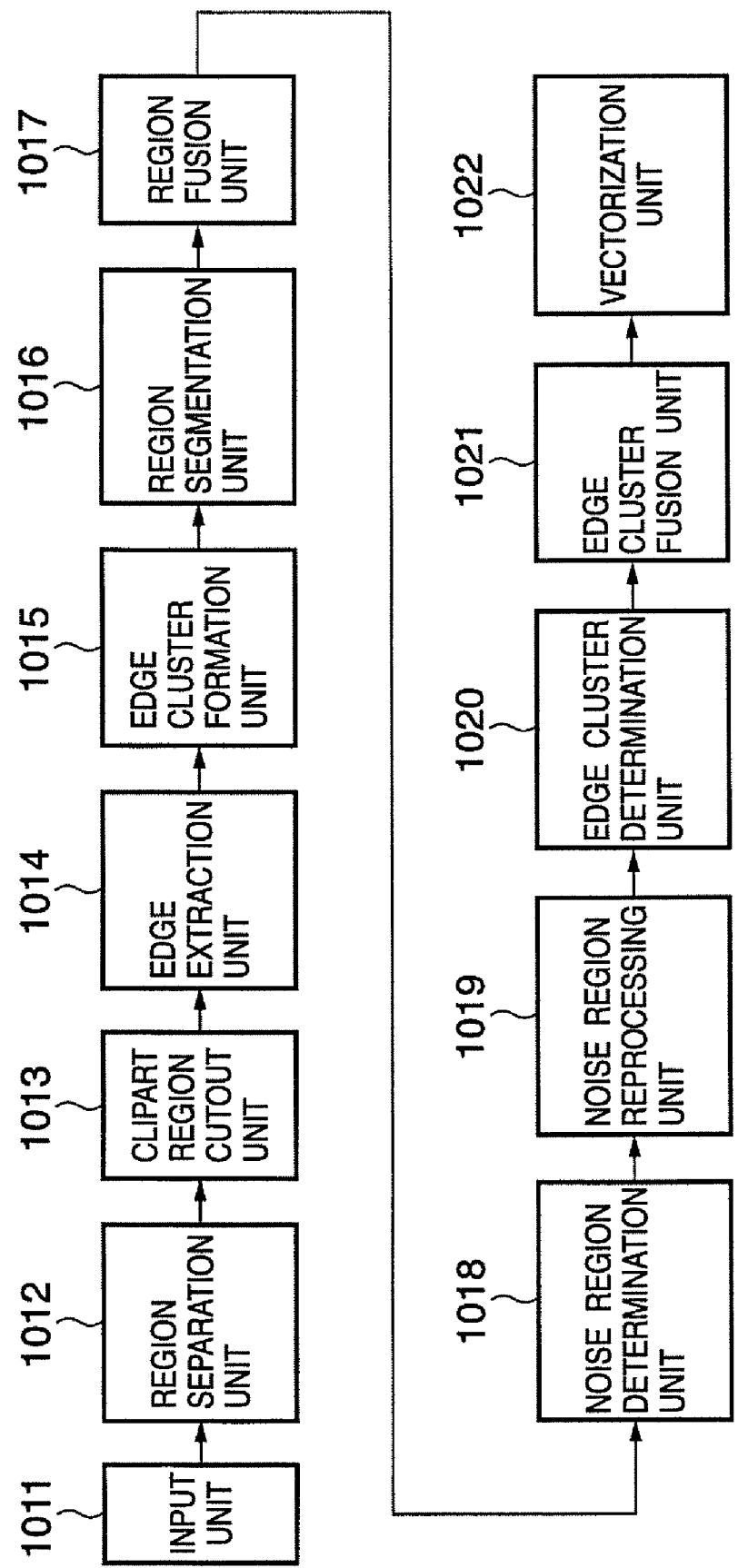
FIG. 15 is a block diagram showing a configuration of an image processing apparatus having a function to perform vectorization processing based on region segmentation according to a second embodiment of the present invention.

A detailed description of a second embodiment of an image processing apparatus according to the present invention will now be provided.
<Apparatus Configuration>
FIG. 15 is a block diagram showing a configuration of an image processing apparatus having a function to perform vectorization processing based on region segmentation according to a second embodiment of the present invention.

In FIG. 15, an input unit 1101 performs scanning to input paper information as a color document image. In addition, a region separation unit 1012 separates the color document image into a plurality of types of regions including a photographic region. Furthermore, a clipart selection unit 1013 selects clipart images from each separated region. Moreover, an edge extraction unit 1014 extracts edges from clipart images based on color characteristics. Additionally, an edge cluster formation unit 1015 forms edge clusters based on edge information.

Furthermore, a region separation unit 1016 segments pixels other than those of edge clusters into regions based on color characteristics. A region fusion unit 1017 integrates similar regions. A noise region determination unit 1018 determines a noise region from the segmented regions. A noise region re-processing unit 1019 reprocesses a noise region when such a region is determined. An edge cluster determination unit 1020 determines an edge cluster from the segmented regions. An edge cluster fusion unit 1021 integrates a cluster that has been determined to be an edge cluster with an initially formed edge cluster. A vectorization unit 1022 converts results of region segmentation into vector data.

Figure 27:
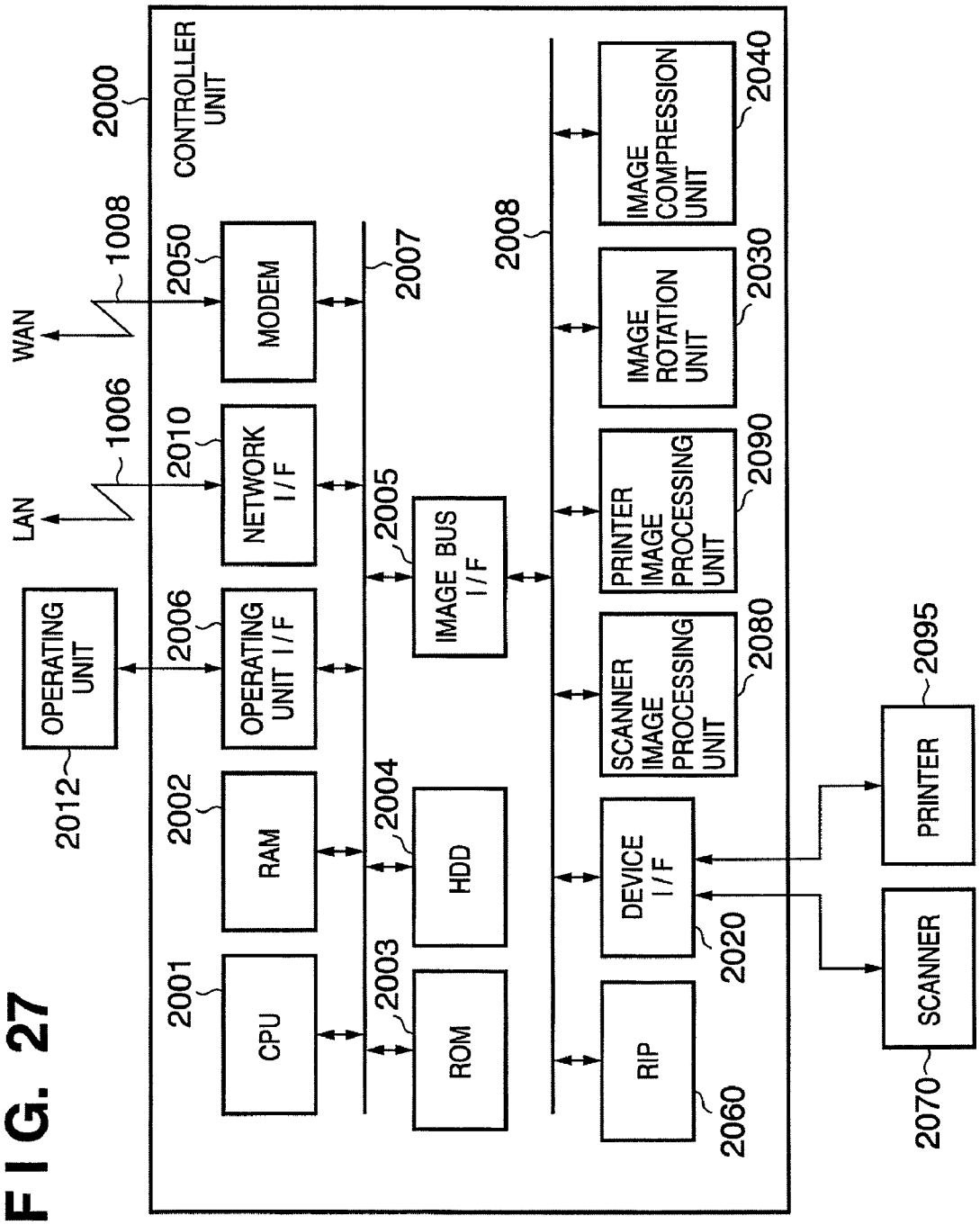
FIG. 27 is a block diagram showing a configuration of principal portions of a digital multiple function processing machine (MFP) that is the second embodiment realizing the image processing apparatus shown in FIG. 15.

FIG. 27 is a block diagram showing a configuration of principal portions of a digital multiple function processing machine (MFP) that is the second embodiment realizing the image processing apparatus shown in FIG. 15. In the present embodiment, while a digital multiple function processing machine (MFP) with scanner or printer functions is used as an image processing apparatus, a system in which a general-purpose scanner is connected to a personal computer may be used instead as the image processing apparatus.

As shown in FIG. 27, the MFP is equipped with a controller unit 2000 which functions as an image processing apparatus. The controller unit 2000 connects a scanner 2070, which is an image input device, and a printer 2095, which is an image output device. The controller unit 2000 performs control in order to achieve a copy function in which image data read from an original image by the scanner 2070 is printed out by the printer 2095. In addition, the controller unit 2000 performs control so that pattern images and device information or the like may be inputted and outputted between other apparatuses via. a LAN 1006 or a public line (WAN) 1008.

The controller unit 2000 has a CPU 2001, as shown in FIG. 27. The CPU 2001 launches an operating system (OS) using a boot program stored in a ROM 2003. The CPU 2001 performs various processing by executing application programs stored in an HDD (hard disk drive) 2004 on the OS. A RAM 2002 is used as a work area for the CPU 2001. Besides providing a work area for the CPU 2001, the RAM 2002 also provides an image memory area for temporarily storing image data. The HDD 2004 stores image data in addition to the above-described application programs.

The ROM 2003 and the RAM 2002 are connected to the CPU 2001 via a system bus 2007. In addition, an operating unit I/F (operating unit interface) 2006, a network I/F (network interface) 2010, a modem 2050 and an image bus I/F (image bus interface) 2005 are connected to the CPU 2001.

The operating unit I/F 2006 provides an interface with an operating unit 2012 which has a touch panel, and outputs image data to the operating unit 2012 to be displayed thereon. In addition, the operating unit I/F 2006 sends out information inputted by a user at the operating unit 2012 to the CPU 2001.

The network I/F 2010 is connected to the LAN 1006, and performs via the LAN 1006 input/output of information between each apparatus connected to the LAN 1006. The modem 2050 is connected to the public line 1008, and performs input/output of information between each apparatus connected to the public line 1008.

The image bus I/F 2005 is a bus bridge for connecting the system bus 2007 with an image bus 2008 which performs high-speed transfer of image data, and for performing data structure conversion. The image bus 2008 is configured by a PCI bus or IEEE 1394. A raster image processor (RIP) 2060, a device I/F 2020, a scanner image processing unit 2080, a printer image processing unit 2090, an image rotation unit 2030, and an image compression unit 2040 are provided on the image bus 2008.

The RIP 2060 is a processor for developing PDL codes into bit map images. The scanner 2070 and the printer 2095 are connected to the device I/F 2020, which performs synchronous system/asynchronous system conversion of image data. The scanner image processing unit 2080 performs correction, processing and editing of input image data. The printer image processing unit 2090 performs printer correction, resolution conversion and the like for print-out image data. The image rotation unit 2030 performs rotation of image data. The image compression unit 2040 compresses multivalued image data into JPEG data and binary image data into data such as JBIG, MNR and MH, and also performs elongation processing thereof.

<Overview of Vectorization Processing Based on Region Segmentation>

Figure 16:
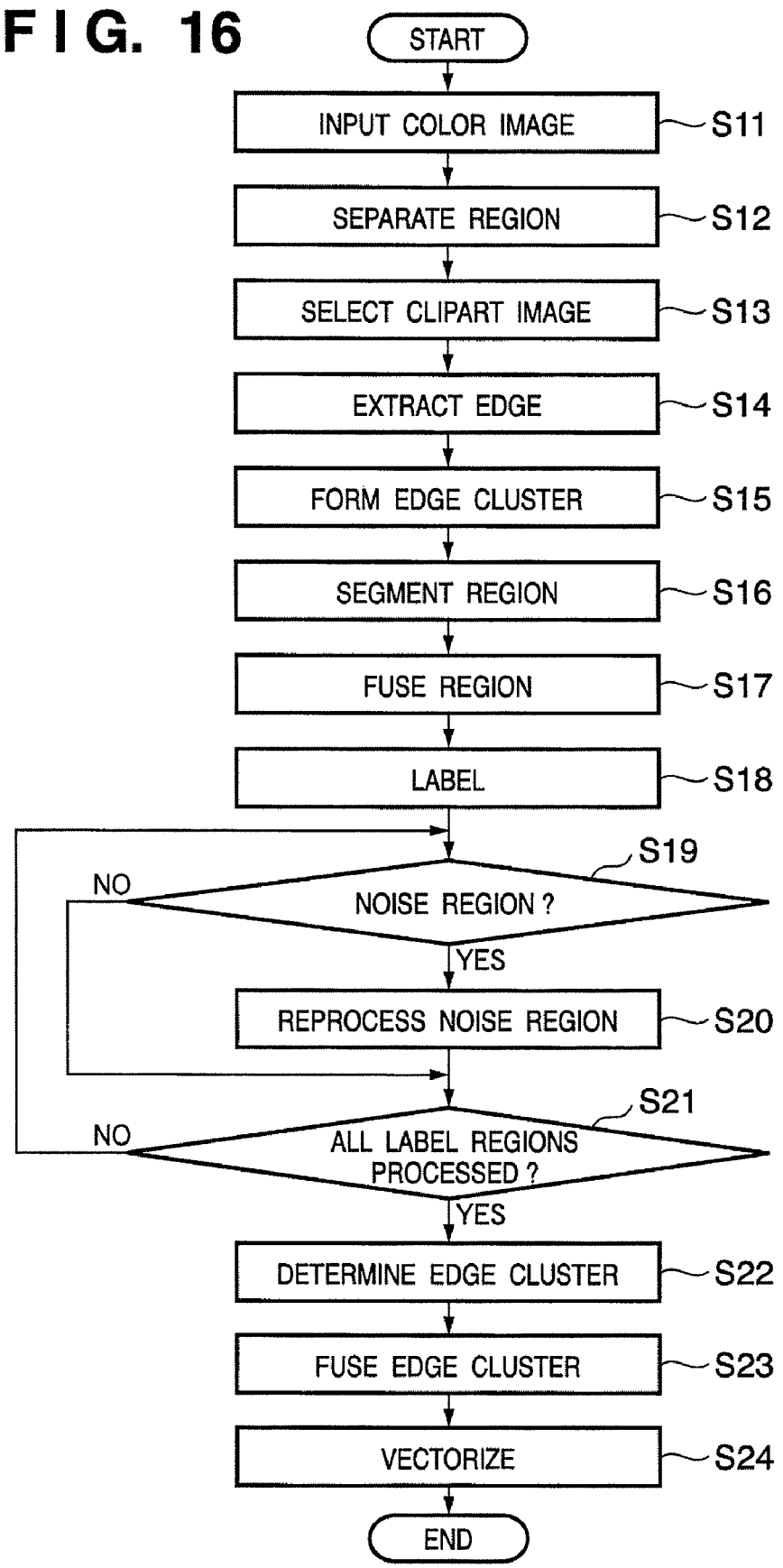
FIG. 16 is a flowchart for providing an overview of vectorization processing based on region segmentation of a clipart image according to the second embodiment of the present invention.

FIG. 16 is a flowchart for providing an overview of vectorization processing based on region segmentation of a clipart image according to the second embodiment of the present invention.

First, at the input unit 1011, paper information is inputted via the scanner to obtain color document image data (step S11). Next, at the region separation unit 1012, the inputted color document image is converted into binary data, and the binary image data is separated into a plurality of types of regions such as text, photograph, table and the like (step S12). As an example of a method to realize this region separation processing, a region separation technique described in U.S. Pat. No. 5,680,478 may be used. A description of "Method and Apparatus for character recognition (Shin-Ywan Wang et al. / Canon K. K.)" is provided in the above-mentioned patent document. At the clipart image selection unit 13, a clipart image is selected from the regions separated in the previous step (step 513).

At the edge extraction unit 14, edge extraction processing is performed based on color characteristics (step S14). As an edge extraction method, a well-known Laplacian filter or the like is used to generate edge image information (pixel values indicate edge strength). At the edge cluster forming unit 1015, an edge cluster is formed from pixels with high edge strength (step S15). Details of this edge cluster forming processing will be provided later. By creating an edge cluster in this manner, edge portions of a clipart image may be clusterized.

Next, at the region segmentation unit 1016, clustering processing is performed based on color characteristics using pixels other than the edge cluster, and the image is segmented into clusters (regions) (step S16). Details of this region segmentation processing will be provided later. In addition, at the cluster fusion unit 1017, fusion of clusters segmented in the previous step is performed based on degrees of similarity (step S17). Details of this cluster fusion processing will be provided later.

At the noise region determination unit 1018, the results of region segmentation are labeled (step S18), and determination is made on whether a region is a noise region based on the size of each label region (step S19). As a result, when a label region is somewhat small (Yes), the region is determined to be a noise region. An example of this noise determination processing will be described later. After determined to be a noise region in step S19, clustering processing is once again performed at the noise reprocessing unit 1019 on noise pixels contained in the determined noise region based on degrees of similarity to the regions adjacent to the noise pixel (step S20). Details of this noise region reprocessing will be provided later. After the reprocessing of step S20, determination is made on whether noise processing has been concluded on all label regions (step S21). As a result, if there is a processing object (No), the process returns to S19 to repeatedly execute the above-described noise region determination processing and noise region reprocessing. On the other hand, if there are no processing objects (Yes), noise processing is concluded and the process proceeds to step S22.

In step S22, at the edge cluster determination unit 1020, clusters other than the edge cluster initially formed from the segmented regions which include edges are determined as edge clusters. Next, at the edge cluster fusion unit 1021, clusters determined to be edge clusters are fused (step S23). Details of edge cluster determination processing and fusion processing will be provided later.

In step S24, at the vectorization unit 1022, edge clusters and segmented clusters other than the edge clusters are converted to vector data on a per-cluster basis based on contour lines and internal colors. An example of a method to achieve this vectorization processing is, for instance, the method described in Japanese Patent No. 2885999 which involves tracking of a contour line of a binary image, and selecting the coordinate vectors thereof to perform vectorization. It is assumed that the technique described above will also be used in the vectorization processing in the present embodiment.

<Example of Selection of Clipart Image>

Figure 17:
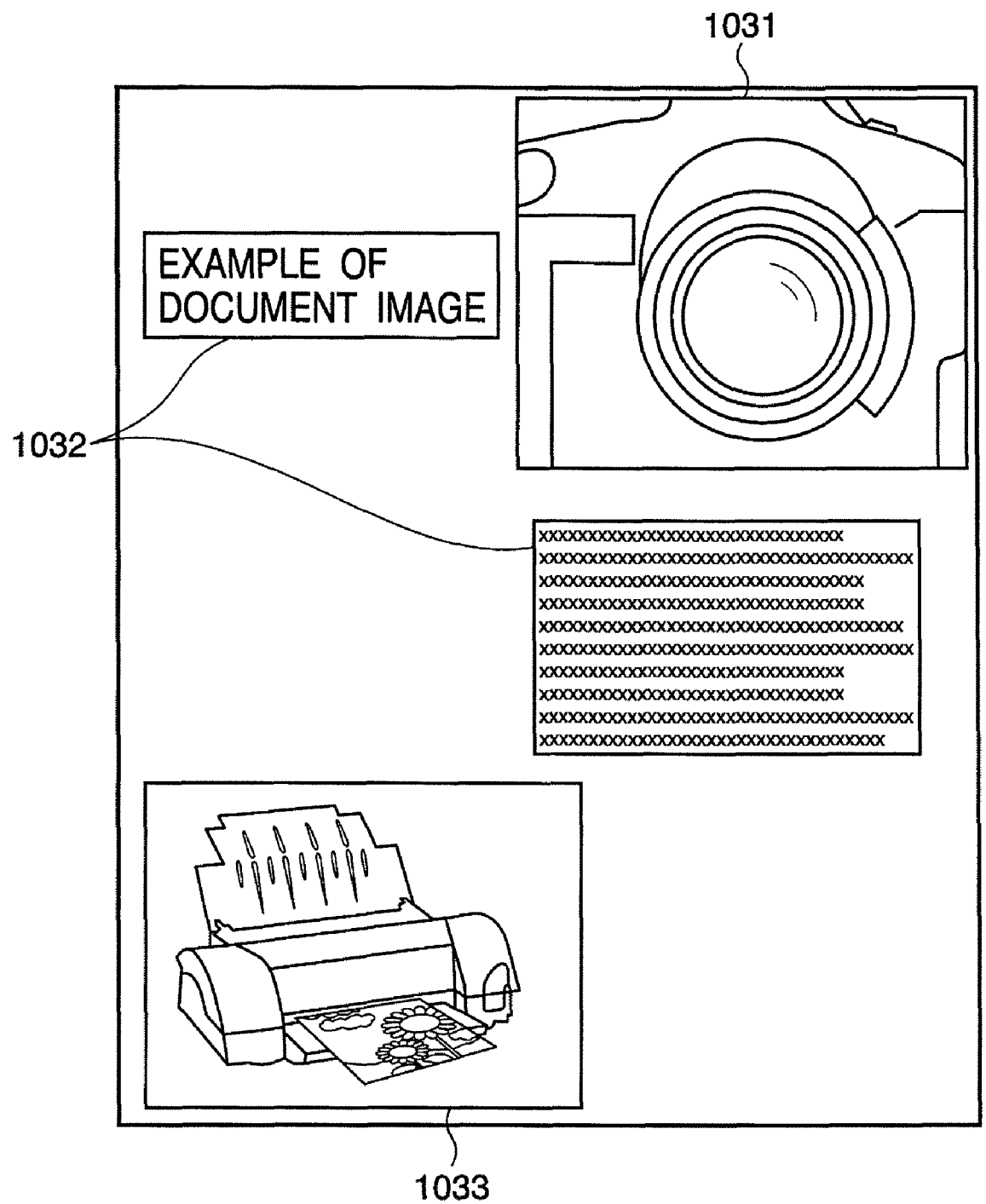
FIG. 17 is a diagram showing an example of a selection of a clipart image from a document image in the image processing according to the second embodiment of the present invention.

FIG. 17 is a diagram showing an example of a selection of a clipart image from a document image in the image processing according to the second embodiment of the present invention. In the document image shown in FIG. 17, a photographic region 1031, a text region 1032 and a clipart region 1033 are respectively separated as rectangular regions by the above-mentioned region separation method.

<Edge Cluster Formation Processing>

Figure 18:
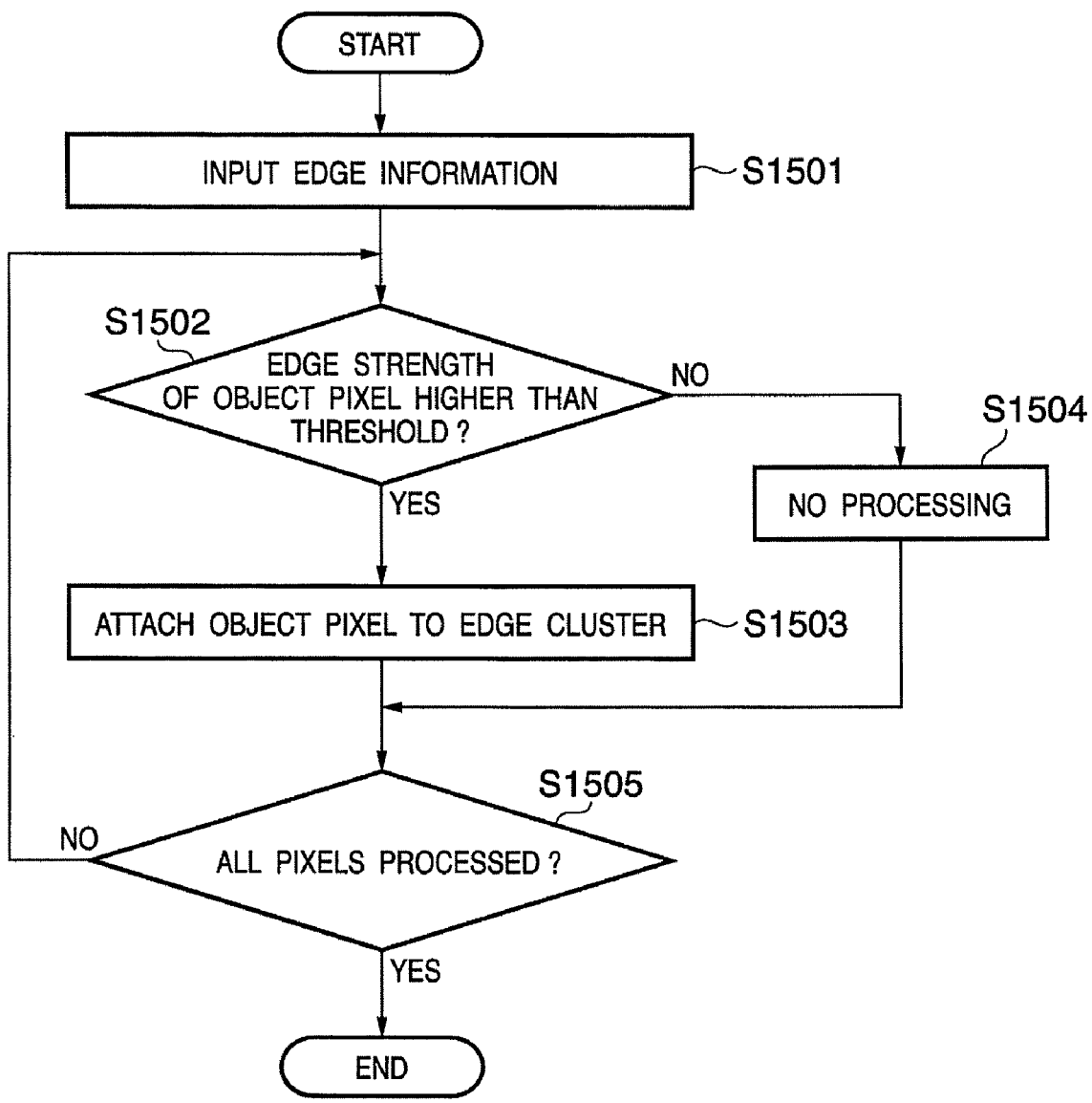
FIG. 18 is a flowchart for explaining details of edge cluster formation processing of step S15 in FIG. 16.

FIG. 18 is a flowchart for explaining details of edge cluster formation processing of step S15 in FIG. 16.

First, an edge image indicating an edge strength extracted from a clipart image is inputted (step 1501). The edge strength of the raster-scanned start pixel is compared to a preset threshold to determine whether the edge strength of the object pixel is higher than the threshold (step S1502). As a result, if the edge strength of the object pixel is higher than the threshold (Yes), the pixel is determined to be reliably at an edge, and the pixel is attached to the edge cluster (step S1503). On the other hand, if the edge strength of the object pixel is lower than the threshold (No), the pixel is not attached to the edge cluster (step S1504). After the reprocessing of steps S1503 and S1504, determination is made on whether noise processing has been concluded on all pixels (step S1505). As a result, if there is an unprocessed pixel (No), the process returns to S1502 to repeatedly execute the above-described processing. On the other hand, if there are no unprocessed pixels (Yes), edge cluster forming processing is concluded. For the present embodiment, while the description involves only one edge cluster, in the event that a plurality of colors are contained in an edge, the edge may be segmented on a per-color basis to generate a plurality of edge clusters.

<Example of Edge Cluster Formation>

FIG. 19 is a diagram showing an example of an edge cluster formed from a clipart image by the image processing according to the second embodiment of the present invention. In the clipart image shown in FIG. 19, an edge image 1051 is formed by edge extraction. When the above-described edge cluster formation processing is performed by setting the threshold to 120, an edge cluster 1052 is formed.

<Region Segmentation Processing>

Figure 20:
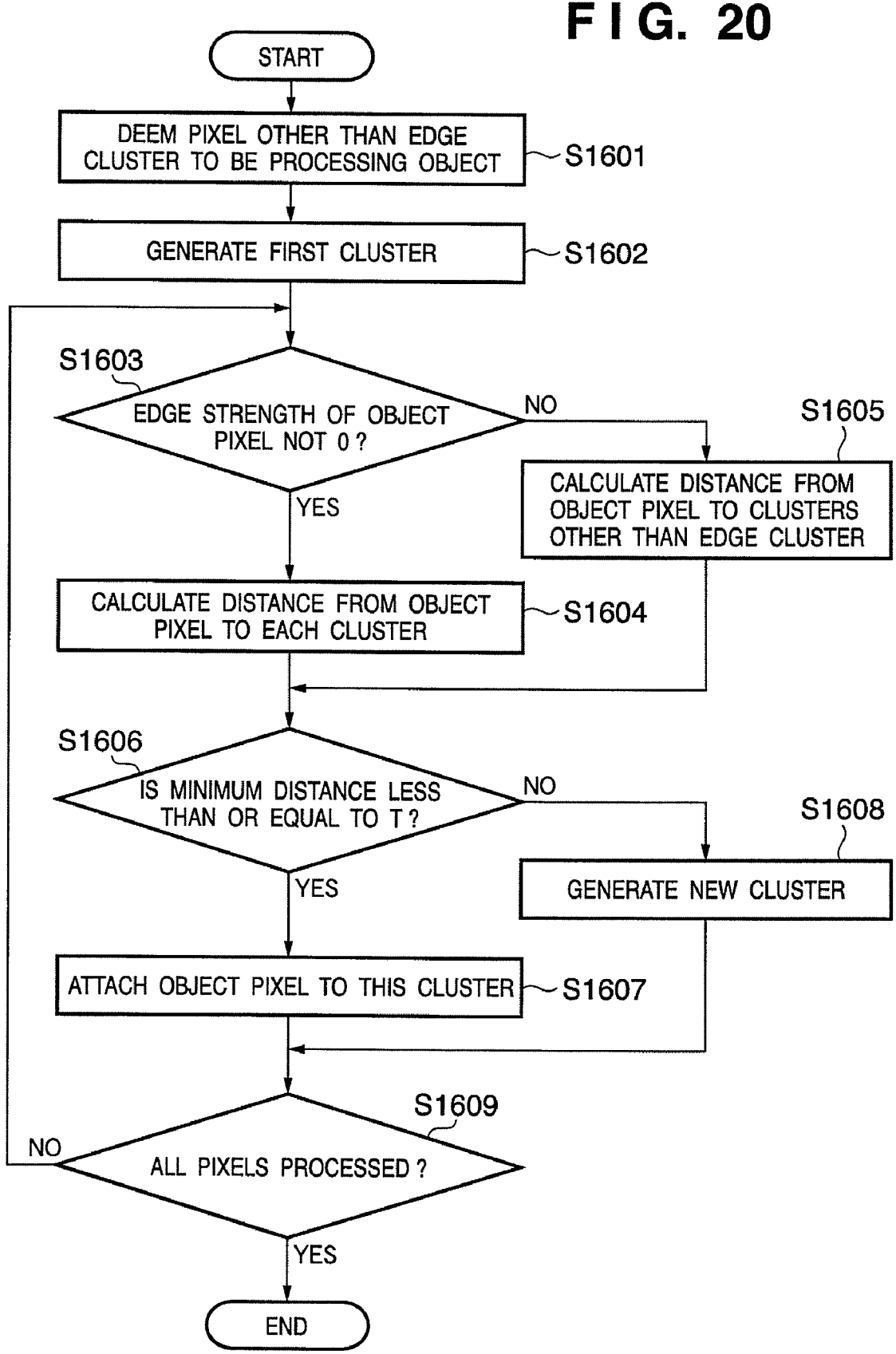
FIG. 20 is a flowchart for explaining details of region segmentation processing of step S16 in FIG. 16.

FIG. 20 is a flowchart for explaining details of region segmentation processing of step S16 in FIG. 16.

First, pixels other than the edge cluster are deemed processing objects of region segmentation (step S1601). A first cluster is generated from a start pixel other than the raster-scanned edge cluster (step S1602). Determination is made on whether the next pixel is on an edge (step 1603). As a result of the determination, if the edge strength of the object pixel is not 0, it is determined that the pixel may be on an edge (Yes), and distances between this pixel and each cluster (including the edge cluster formed in step S15) are calculated (step S1604). On the other hand, if the edge strength of the object pixel is 0, it is determined that the pixel is not on an edge (No), and distances between this pixel and the clusters other than the edge cluster are calculated to make sure that the pixel is not included in the edge cluster (step S1605). Euclidean distances of color characteristics are used as distances. When a distance is short, it is assumed that the characteristics of an object pixel and a cluster are close to each other, or in other words, the degree of similarity of the object pixel and the cluster is high. While RGB values are used herein for calculating distances, other information regarding color space, or information other than color may alternatively be used as a parameter.

After the processing of steps S1604 or S1605, the highest degree of similarity and a cluster number corresponding to that degree of similarity is recorded, and the degree of similarity is compared with a preset threshold (step S1606). As a result, if the degree of similarity is higher than the threshold (Yes), the object pixel is attached to the recorded cluster (step S1607). On the other hand, if the degree of similarity is lower than the threshold (No), a new cluster is generated from the object pixel (step S1608). After the processing of steps S1607 or S1608, determination is made on whether processing on all pixels has been concluded (step S1609). As a result, if there is an unprocessed pixel (No), the process returns to S1603 to repeatedly execute the above-described processing. On the other hand, if there are no unprocessed pixels (Yes), region segmentation processing is concluded.

<Cluster fusion processing>

Figure 21:
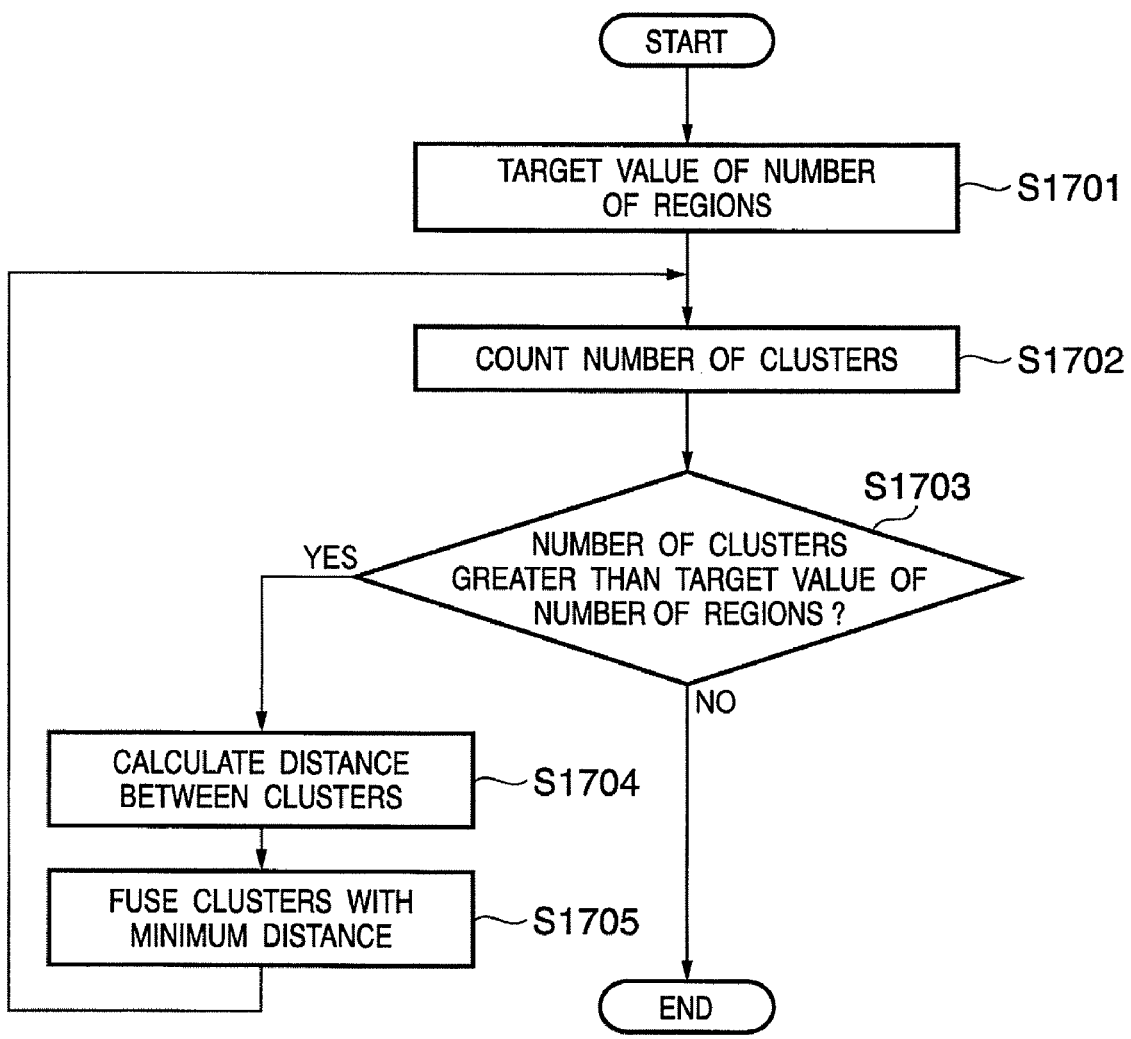
FIG. 21 is a flowchart for explaining details of cluster fusion processing of step S17 in FIG. 16.

FIG. 21 is a flowchart for explaining details of cluster fusion processing of step S17 in FIG. 16.

First, a target value of a number of regions desired to be separated is inputted (step S1701). In the present embodiment, this target value serves as an indicator of the number of colors to be separated. A current number of clusters is counted (step S1702). The current number of clusters is compared to the target value (step S1703). As a result, if the current number of clusters is below the target value (No), fusion processing is concluded. On the other hand, if the current number of clusters is over the target value (Yes), fusion processing of clusters is performed in steps S1704 and S1705.

For fusion processing, in order to prevent erroneous fusion of edge portions of images and portions other than edges, edge clusters are not considered objects of fusion processing. In this light, in step S1704, degrees of similarity between the clusters are calculated, and the two clusters having the highest degree of similarity are deemed objects of fusion processing. Next, in step S1705, the two clusters that are objects of fusion processing are fused into one cluster. After conclusion of the first region fusion, the process returns to step S1702 to count the number of clusters.

<Noise Region Determination Processing>

Figure 22:
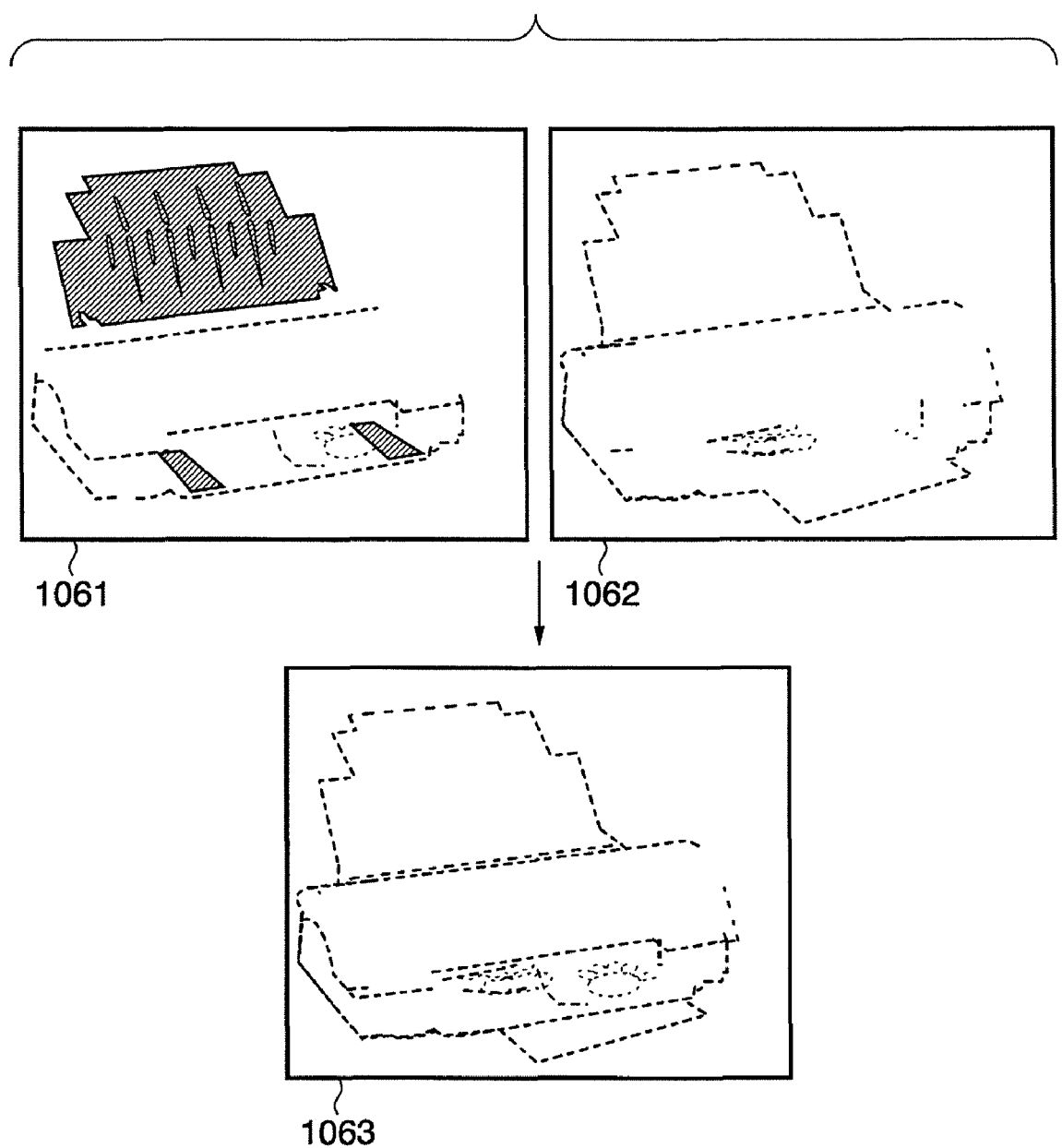
FIG. 22 is a diagram for explaining noise regions determined in step S18 in FIG. 16.

FIG. 22 is a diagram for explaining noise regions determined in step S18 of FIG. 16.

In FIG. 22, the clusters 1061 and 1062 are two clusters used as examples among the clusters during region segmentation processing and after fusion processing. Since a large number of small regions are contained in these clusters, converting contour lines and internal color information of the clusters as-is into vector data will become a problem in that data quantity will become enormous. In order to solve the above problem, as described earlier, in step S18, labeling processing is performed on the region segmentation results. In step S19, determination is made on whether regions are noise regions based on the size of each label region. As a result, a label region is determined to be a noise region when the label region is smaller than a certain threshold, and the process proceeds to noise region reprocessing (step S20). In FIG. 22, each region included in the noise 1063 are portions determined to be noise regions.

<Noise Region Reprocessing>

Figure 23:
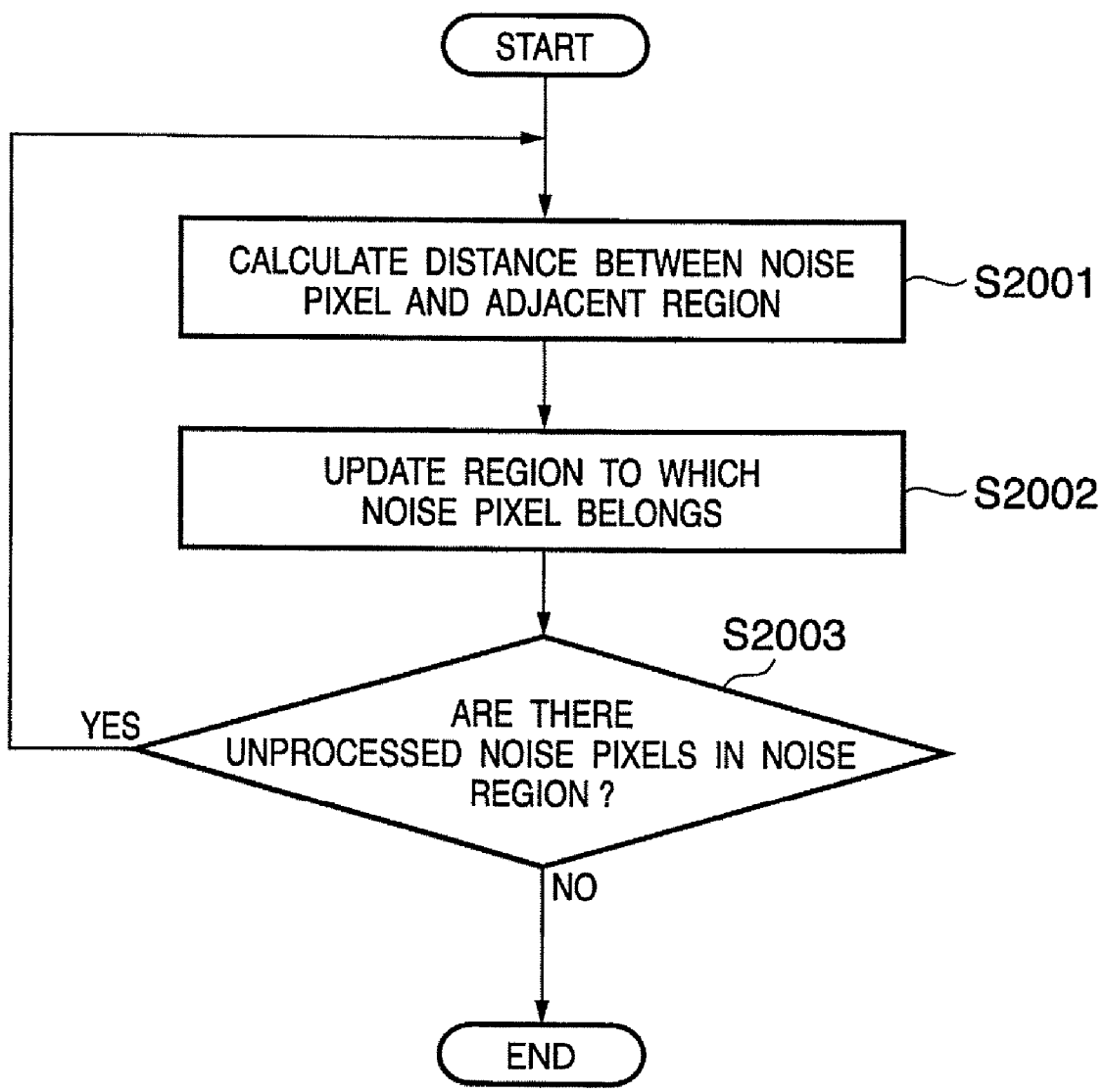
FIG. 23 is a flowchart for explaining details of reprocessing of noise regions of step S20 in FIG. 16.

FIG. 23 is a flowchart for explaining details of reprocessing of noise regions of step S20 in FIG. 16. In step S20, a noise region determined in step S19 is deemed an object of noise region reprocessing. Reprocessing is performed for each noise pixel contained in the noise region.

First, degrees of similarity between a noise pixel and each adjacent cluster are calculated (step S2001). The noise pixel is attached to the cluster with the highest calculated degree of similarity (step S2002). Determination is made on whether the processing of this noise region concludes removal processing of all noise pixels (step S2003). As a result, if there is an unprocessed pixel (Yes), the process returns to S2001 to repeatedly execute the above-described processing. On the other hand, if there are no unprocessed pixels (No), reprocessing of this noise region is concluded.

<Edge Cluster Determination Processing and Fusion Processing>

Figure 24:
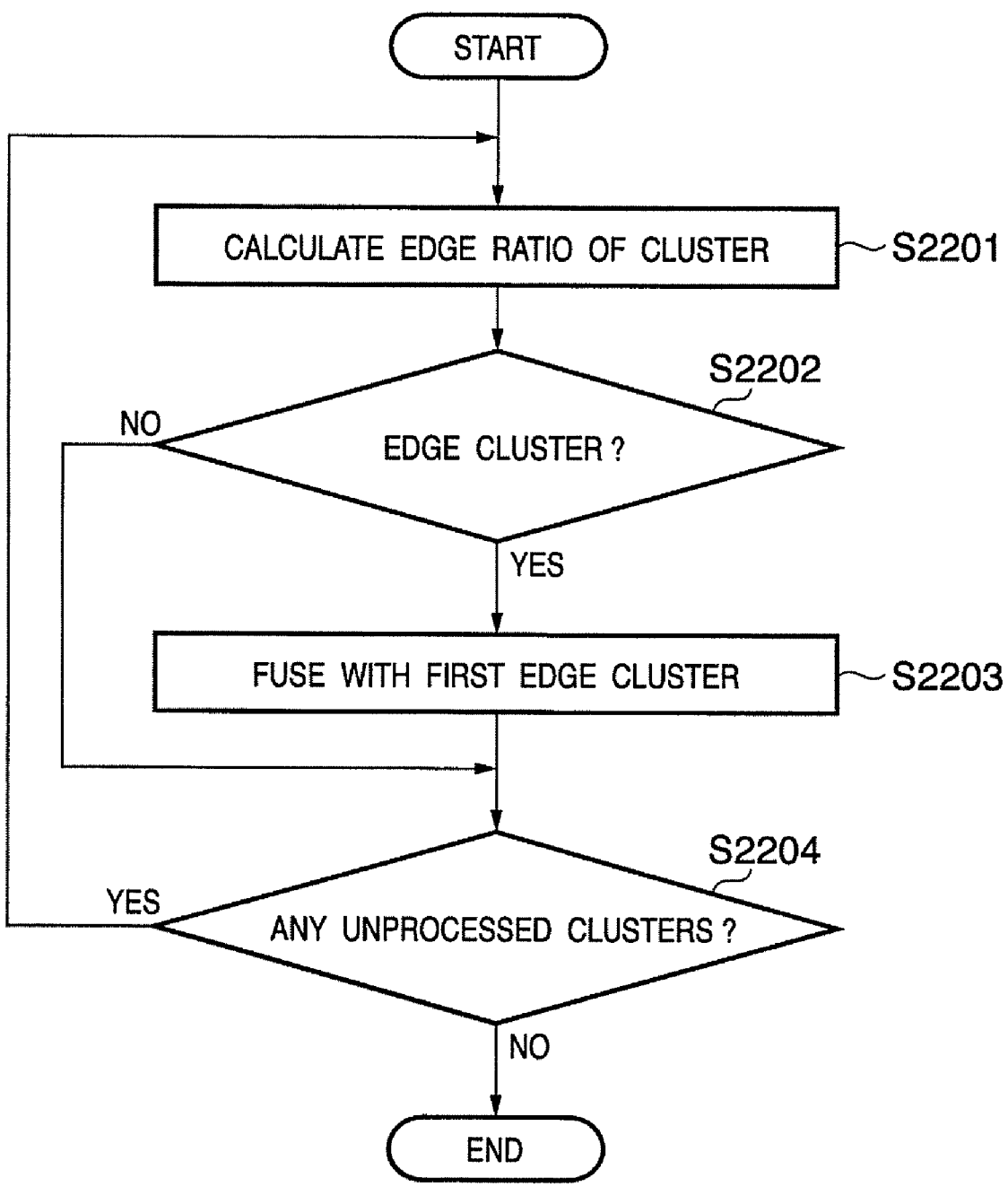
FIG. 24 is a flowchart for explaining details of edge cluster determination processing of step S22 and edge cluster fusion processing of step S23 in FIG. 16.

FIG. 24 is a flowchart for explaining details of. edge cluster determination processing of step S22 and edge cluster fusion processing of step S23 in FIG. 16.

First, edge ratios of clusters other than the edge cluster formed in step S15 are calculated (step S2201). An edge ratio refers to a ratio of a number of pixels in an edge among a number of pixels in clusters. The higher this ratio, the larger the number of pixels deemed edges in a cluster. Determination is made based on edge ratios on whether a processing object cluster is an edge cluster (step S2202). As a result, a cluster is determined to be an edge cluster when its edge ratio is somewhat high (Yes). The information of this cluster is added to the edge cluster formed in step SIS to fuse into a single cluster (step S2203), and the process proceeds to step S2204. On the other hand, a cluster is determined not to be an edge cluster when its edge ratio is not high (No), and the process proceeds to step S2204. In step S2204, it is determined whether there are unprocessed clusters. As a result, if there is an unprocessed cluster (Yes), the process returns to S2201 to repeatedly execute the above-described processing. On the other hand, if there are no unprocessed clusters (No), edge cluster determination processing and fusion processing are concluded.

<Example of Edge Cluster Fusion>

FIG. 25 is a diagram showing an example of fusion of a segmented cluster with a cluster which has been determined to be a edge cluster according to the second embodiment of the present invention. In FIG. 25, reference numeral 1071 denotes the edge cluster formed in step S15. Reference numeral 1072 denotes a cluster determined to be an edge cluster based on the edge ratio thereof. In addition, reference numeral 1073 denotes an edge cluster resulting from fusion of the clusters 1071 and 1072.

<Example of Vectorization Based on Region Segmentation of a Clipart Image>

FIG. 26 is a diagram showing an example of vectorization based on region segmentation of a clipart image according to the second embodiment of the present invention.

First, an example of a result of region segmentation processing will be shown. In FIG. 26, reference numeral 1081 is a clipart image to be region-segmented. When the target value of the number of regions desired to be separated is designated as 16, a series of processing segments the clipart image 1081 into each cluster of the region segmentation results 1082. In this case, "series of processing" refers to the processing of above-mentioned edge cluster formation, region segmentation, region fusion, noise region determination, noise region reprocessing, edge cluster determination and edge cluster fusion.

Next, an example of a result of vectorization processing will be shown. A cluster 1083, a contour line 1084 and internal color information 1085 are shown as examples of cluster contour and internal color information required for vectorization processing. A vector image 1086 is a result of converting the region segmentation result 1082 into vector data.

According to the present embodiment as described above, an edge cluster is formed from edge information, and edge information is placed in a single edge cluster through fusion processing of edge clusters having high edge ratios among segmented regions. Therefore, reusability of edge information as a component is enhanced, while vector data quantity based on region segmentation is reduced.

As seen, according to the present invention, by completely placing edge information into a single edge cluster, and by performing vectorization through accurate tracing of contours of each region, it is now possible to minimize image quality deterioration and reduce the quantity of vectorized data in order to obtain suitable image components.

Other Embodiments

While embodiments have been described in detail above, the present invention may take such forms as, for instance, a system, an apparatus, a method, a program or a storage medium (recording medium). To be more specific, the present invention may be applied to either a system composed of a plurality of devices, or an apparatus consisting of a single device.

In the present invention, a software program which implements the functions of the above-described embodiments (in the embodiments, a program corresponding to the flowcharts shown in the drawings) is directly or remotely supplied to a system or an apparatus. The present invention also includes cases where the functions are achieved by reading out and executing the supplied program codes by a computer of the system or apparatus.

Therefore, the program codes themselves, to be installed to the computer to enable the computer to achieve the functions and processing of the present invention, may also realize the present invention. In other words, the computer program itself for implementing the functions and processing of the present invention are also encompassed in the present invention.

In such cases, as long as program functions are retained, the program may take such forms as an object code, an interpreter-executable program, or script data supplied to an OS.

Recording media for supplying the program include, for instance, a floppy (registered trademark) disk, a hard disk, an optical disk, a magneto-optical disk, an MO, a CD-ROM, a CD-R, a CD-RW, a magnetic tape, a nonvolatile memory card, a ROM, a DVD (DVD-ROM, DVD-R) or the like.

Other methods for supplying the program may include cases where a browser of a client computer is used to connect to an Internet home page to download the program into a recording medium such as a hard disk. In other words, the home page is accessed to download the computer program itself of the present invention or a compressed file having an auto-install function from the home page. In addition, the present invention may also be achieved by dividing the program codes which configure the program of the present invention into a plurality of files, and downloading each file from a different home page. In other words, a WWW server which allows downloading of program codes for achieving the functions and processing of the present invention on a computer by a plurality of users is also included in the present invention.

In addition, the program of the present invention may be encoded and stored in a storage medium such as a CD-ROM to be distributed to users. Users who satisfy certain conditions will be allowed to download key information for decoding from a home page via the Internet. The key information may be used to execute the encoded program to install the same on a computer in order to achieve the present invention.

The functions of the above-described embodiments may also be achieved by executing a read out program by a computer. Alternatively, the functions of the above-described embodiments may be achieved by processing performed by an OS or the like running on a computer, wherein the OS or the like performs a portion of or all of the actual processing based on instructions from the program.

Moreover, the functions of the above-described embodiments may be realized by having the program, readout from the storage medium, written into a memory provided on a function extension board inserted into a computer or a function extension unit connected to the computer. Subsequently, the functions of the above-described embodiments may also be achieved by having a CPU or the like provided on the function extension board or the function extension unit perform a portion of or all of the actual processing based on instructions of the program.

According to the present invention, contour information of a clipart image may be fused in order to generate vector data in which image quality is retained while data quantity is suitably reduced.

In addition, since vectorization is performed from a clipart image with an edge by using edge portions as edge clusters, more accurate edge information may be obtained. Furthermore, since edge information within a clipart may be organized into a single cluster, reusability of edge information may be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2005-302156 filed on Oct. 17, 2005, and 2005-351309 filed on Dec. 5, 2005, which are hereby incorporated by reference herein in their entirety.

What is claimed is:

1. An image processing method for inputting a document image including a clipart image to an image processing apparatus to perform vectorization, the image processing method comprising the steps of:
- region-segmenting the document image and selecting the clipart image;
- obtaining edge strength information for pixels from the clipart image;
- forming an edge cluster based on pixels having the edge strength information that is higher than a threshold;
- segmenting pixels of the clipart image other than the formed edge cluster into a plurality of clusters based on color characteristics of the pixels;
- determining a new edge cluster from the plurality of clusters segmented in the segmenting step by calculating an edge ratio for each of the plurality of clusters;
- wherein the determining step is performed by calculating an edge ratio of a cluster other than the initially formed edge cluster, which contains edge information, determining the cluster as an edge cluster based on the magnitude of the edge ratio; and
- fusing the new edge cluster determined in the determining step with the edge cluster formed in the edge cluster forming step; and
- converting each cluster after cluster fusion to vector data based on a contour line and an internal color of each cluster.

2. The image processing method of claim 1, further comprising the step of fusing, before executing the determining step, two or more clusters similar to each other, the fused clusters being selected from the plurality of segmented clusters other than the edge cluster formed in the forming step.

3. The image processing method of claim 1, further comprising the steps of:
- obtaining label areas by labeling the plurality of clusters segmented in the segmentation step, and determining whether each label area is a noise area based on the size of the label area;
- calculating a degree of similarity of each pixel within an noise area and other adjacent clusters; and
- reprocessing the noise area so that each pixel within the noise area is fused with a cluster among the other clusters which has the highest degree of similarity.

4. An image processing apparatus adapted to vectorize a document image including a clipart image, the image processing apparatus comprising:
- an input unit adapted to input the document image;
- a selection unit adapted to region-segment the document image and select the clipart image;
- an extraction unit adapted to extract edge strength information for pixels from the clipart image;
- an edge cluster formation unit adapted to form an edge cluster based on pixels having the edge strength information that is higher than a threshold;
- a segmentation unit adapted to segment pixels of the clipart image other than the formed edge cluster into a plurality of clusters based on color characteristics of the pixels;
- a determining unit for determining a new edge cluster from the plurality clusters segmented in the segementing unit by calculating an edge ratio for each of the plurality of clusters.
- wherein the determining unit calculates an edge ratio of a cluster other than the initially formed edge cluster, which contains edge information, and determines the cluster as an edge cluster based on magnitude of the edge ratio;
- a fusing unit for fusing the new edge cluster determined in the determining unit with the edge cluster formed in the edge cluster forming unit; and
- a conversion unit adapted to convert each cluster after cluster fusion to vector data based on a contour line and an internal color of each cluster.

5. A non-transitory computer-readable storage medium storing a computer program for causing a computer, which inputs a document image including a clipart image to perform vectorization, to execute the procedures of:
- region-segmenting the document image and selecting the clipart image;
- obtaining edge strength information for pixels from the clipart image;
- forming an edge cluster based on pixels having the edge strength information that is higher than a threshold;
- segmenting pixels of the clipart image other than the formed edge cluster into a plurality of clusters based on color characteristics of the pixels;
- determining a new edge cluster from the plurality of clusters segmented in the segmenting step by calculating an edge ratio for each of the plurality of clusters;
- wherein the determining step is performed by calculating an edge ratio of a cluster other than the initially formed edge cluster, which contains edge information, and determining the cluster as an edge cluster based on the magnitude of the edge ratio; and
- fusing the new edge cluster determined in the determining step with the edge cluster formed in the edge cluster forming step; and
- converting each cluster after cluster fusion to vector data based on a contour line and an internal color of each cluster.

* * * * *